(12) United States Patent
Matsuoka et al.

(10) Patent No.: US 11,739,968 B2
(45) Date of Patent: *Aug. 29, 2023

(54) CONTROLLING AN HVAC SYSTEM USING AN OPTIMAL SETPOINT SCHEDULE DURING A DEMAND-RESPONSE EVENT

(71) Applicant: Google LLC, Mountain View, CA (US)

(72) Inventors: Yoky Matsuoka, Los Altos Hills, CA (US); Mark Malhotra, San Mateo, CA (US); Allen J. Minich, San Mateo, CA (US); Mark D. Stefanski, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 454 days.

This patent is subject to a terminal disclaimer.

(21) Appl. No.: 16/898,063

(22) Filed: Jun. 10, 2020

(65) Prior Publication Data

US 2020/0300491 A1  Sep. 24, 2020

Related U.S. Application Data

(63) Continuation of application No. 15/805,312, filed on Nov. 7, 2017, now Pat. No. 10,718,539, which is a
(Continued)

(51) Int. Cl.
*F24F 11/64* (2018.01)
*G05D 23/19* (2006.01)
(Continued)

(52) U.S. Cl.
CPC .............. *F24F 11/64* (2018.01); *F24F 11/30* (2018.01); *F24F 11/62* (2018.01);
(Continued)

(58) Field of Classification Search
None
See application file for complete search history.

(56) References Cited

U.S. PATENT DOCUMENTS 4,223,831 A   9/1980 Szarka
4,298,946 A   11/1981 Hartsell et al.
(Continued)

FOREIGN PATENT DOCUMENTS

CA   2202008 C   2/2000
CN   1882894 A   12/2006
(Continued)

OTHER PUBLICATIONS

Korner et al. 'Decision support for dynamic greenhouse climate control strategies' Computers and Electronics in Agriculture 60 (2008) pp. 18-30, Elsevier.*
(Continued)

*Primary Examiner* — Bernard G Lindsay
(74) *Attorney, Agent, or Firm* — Kilpatrick Townsend & Stockton LLP

(57) ABSTRACT

A control system includes an energy management system in operation with intelligent, network-connected thermostats located in structures. The thermostats are operable to control heating, ventilation, and air conditioning (HVAC) systems. Control during a demand response (DR) event period may be performed based on an optimal control trajectory of the HVAC system, where the control trajectory is optimal in that it minimizes a cost function.

20 Claims, 15 Drawing Sheets

Related U.S. Application Data continuation of application No. 13/866,635, filed on Apr. 19, 2013, now Pat. No. 9,810,442, which is a continuation-in-part of application No. 13/842,213, filed on Mar. 15, 2013, now Pat. No. 9,595,070.

(51) Int. Cl.
| | | |
|---|---|---|
| *F24F 11/62* | | (2018.01) |
| *F24F 11/30* | | (2018.01) |
| *F24F 140/60* | | (2018.01) |
| *F24F 120/20* | | (2018.01) |

(52) U.S. Cl.
CPC ..... *G05D 23/1904* (2013.01); *G05D 23/1905* (2013.01); *F24F 2120/20* (2018.01); *F24F 2140/60* (2018.01)

(56) References Cited

U.S. PATENT DOCUMENTS

| | | | |
|---|---|---|---|
| 4,335,847 | A | 6/1982 | Levine |
| 4,408,711 | A | 10/1983 | Levine |
| 4,615,380 | A | 10/1986 | Beckey |
| 4,674,027 | A | 6/1987 | Beckey |
| 4,685,614 | A | 8/1987 | Levine |
| 4,751,961 | A | 6/1988 | Levine et al. |
| 4,847,781 | A | 7/1989 | Brown, III et al. |
| 5,088,645 | A | 2/1992 | Bell |
| 5,211,332 | A | 5/1993 | Adams |
| 5,224,648 | A | 7/1993 | Simon et al. |
| 5,240,178 | A | 8/1993 | Dewolf et al. |
| 5,395,042 | A | 3/1995 | Riley et al. |
| 5,462,225 | A | 10/1995 | Massara et al. |
| 5,476,221 | A | 12/1995 | Seymour |
| 5,499,196 | A | 3/1996 | Pacheco |
| 5,544,036 | A | 8/1996 | Brown, Jr. et al. |
| 5,555,927 | A | 9/1996 | Shah |
| 5,611,484 | A | 3/1997 | Uhrich |
| 5,761,083 | A | 6/1998 | Brown, Jr. et al. |
| 5,816,491 | A | 10/1998 | Berkeley et al. |
| 5,902,183 | A | 5/1999 | D'Souza |
| 5,909,378 | A | 6/1999 | De Milleville |
| 5,977,964 | A | 11/1999 | Williams et al. |
| 6,062,482 | A | 5/2000 | Gauthier et al. |
| 6,098,893 | A | 8/2000 | Berglund et al. |
| 6,122,603 | A | 9/2000 | Budike, Jr. |
| 6,216,956 | B1 | 4/2001 | Ehlers et al. |
| 6,311,105 | B1 | 10/2001 | Budike, Jr. |
| 6,349,883 | B1 | 2/2002 | Simmons et al. |
| 6,356,204 | B1 | 3/2002 | Guindi et al. |
| 6,453,687 | B2 | 9/2002 | Sharood et al. |
| 6,513,723 | B1 | 2/2003 | Meuller et al. |
| 6,574,581 | B1 | 6/2003 | Bohrer et al. |
| 6,619,055 | B1 | 9/2003 | Addy |
| 6,643,567 | B2 | 11/2003 | Kolk et al. |
| 6,645,066 | B2 | 11/2003 | Gutta et al. |
| 6,769,482 | B2 | 8/2004 | Wagner et al. |
| 6,785,630 | B2 | 8/2004 | Kolk et al. |
| 6,868,293 | B1 | 3/2005 | Schurr et al. |
| 6,891,838 | B1 | 5/2005 | Petite et al. |
| 6,975,958 | B2 | 12/2005 | Bohrer et al. |
| 7,024,336 | B2 | 4/2006 | Salsbury et al. |
| 7,135,965 | B2 | 11/2006 | Chapman, Jr. et al. |
| 7,289,887 | B2 | 10/2007 | Rodgers |
| 7,333,880 | B2 | 2/2008 | Brewster et al. |
| 7,346,467 | B2 | 3/2008 | Bohrer et al. |
| RE40,437 | E | 7/2008 | Rosen |
| 7,469,550 | B2 | 12/2008 | Chapman, Jr. et al. |
| 7,537,171 | B2 | 5/2009 | Mueller et al. |
| 7,644,869 | B2 | 1/2010 | Hoglund et al. |
| 7,702,424 | B2 | 4/2010 | Cannon et al. |
| 7,784,704 | B2 | 8/2010 | Harter |
| 7,802,618 | B2 | 9/2010 | Simon et al. |
| 7,837,958 | B2 | 11/2010 | Crapser et al. |
| 7,848,900 | B2 | 12/2010 | Steinberg et al. |
| 7,854,389 | B2 | 12/2010 | Ahmed |
| 7,908,116 | B2 | 3/2011 | Steinberg et al. |
| 7,908,117 | B2 | 3/2011 | Steinberg et al. |
| 8,010,237 | B2 | 8/2011 | Cheung et al. |
| 8,019,567 | B2 | 9/2011 | Steinberg et al. |
| 8,090,477 | B1 | 1/2012 | Steinberg |
| 8,131,207 | B2 | 3/2012 | Hwang et al. |
| 8,131,497 | B2 | 3/2012 | Steinberg et al. |
| 8,131,506 | B2 | 3/2012 | Steinberg et al. |
| 8,160,752 | B2 | 4/2012 | Weaver et al. |
| 8,180,492 | B2 | 5/2012 | Steinberg |
| 8,386,087 | B2 | 2/2013 | Spicer et al. |
| 8,452,457 | B2 | 5/2013 | Matsuoka et al. |
| 8,544,285 | B2 | 10/2013 | Stefanski et al. |
| 8,554,376 | B1 | 10/2013 | Matsuoka et al. |
| 8,600,561 | B1 | 12/2013 | Modi et al. |
| 8,606,374 | B2 | 12/2013 | Fadell et al. |
| 8,630,740 | B2 | 1/2014 | Matsuoka et al. |
| 8,630,741 | B1 | 1/2014 | Matsuoka et al. |
| 8,635,373 | B1 | 1/2014 | Supramaniam et al. |
| 8,752,771 | B2 | 6/2014 | Warren et al. |
| 8,757,507 | B2 | 6/2014 | Fadell et al. |
| 8,843,239 | B2 | 9/2014 | Mighdoll et al. |
| 8,850,348 | B2 | 9/2014 | Fadell et al. |
| 8,893,032 | B2 | 11/2014 | Bruck et al. |
| 8,918,219 | B2 | 12/2014 | Sloo et al. |
| 9,121,623 | B2 | 9/2015 | Filson et al. |
| 9,261,287 | B2 | 2/2016 | Warren et al. |
| 9,494,332 | B2 | 11/2016 | Filson et al. |
| 9,595,070 | B2 | 3/2017 | Matsuoka et al. |
| 9,605,858 | B2 | 3/2017 | Warren et al. |
| 9,807,099 | B2 | 10/2017 | Matsuoka et al. |
| 9,810,442 | B2 * | 11/2017 | Matsuoka ................ F24F 11/62 |
| 9,910,449 | B2 | 3/2018 | Matsuoka et al. |
| 10,241,527 | B2 | 3/2019 | Fadell et al. |
| 10,438,304 | B2 | 10/2019 | Matsuoka et al. |
| 10,581,862 | B2 | 3/2020 | Matsuoka et al. |
| 2003/0055776 | A1 | 3/2003 | Samuelson |
| 2003/0216838 | A1 | 11/2003 | Dudley |
| 2004/0034484 | A1 | 2/2004 | Solomita, Jr. et al. |
| 2004/0095237 | A1 | 5/2004 | Chen et al. |
| 2004/0134521 | A1 | 7/2004 | Liberman |
| 2004/0249479 | A1 | 12/2004 | Shorrock |
| 2005/0119793 | A1 | 6/2005 | Amundson et al. |
| 2005/0125083 | A1 | 6/2005 | Kiko |
| 2005/0128067 | A1 | 6/2005 | Zakrewski |
| 2005/0189429 | A1 | 9/2005 | Breeden |
| 2005/0246408 | A1 | 11/2005 | Chung |
| 2005/0270151 | A1 | 12/2005 | Winick |
| 2005/0280421 | A1 | 12/2005 | Yomoda et al. |
| 2006/0186214 | A1 | 8/2006 | Simon et al. |
| 2006/0196953 | A1 | 9/2006 | Simon et al. |
| 2006/0207268 | A1 | 9/2006 | Kelso et al. |
| 2006/0208099 | A1 | 9/2006 | Chapman et al. |
| 2007/0038787 | A1 | 2/2007 | Harris et al. |
| 2007/0045431 | A1 | 3/2007 | Chapman, Jr. et al. |
| 2007/0241203 | A1 | 10/2007 | Wagner et al. |
| 2008/0015740 | A1 | 1/2008 | Osann |
| 2008/0015742 | A1 | 1/2008 | Kulyk et al. |
| 2008/0191045 | A1 | 8/2008 | Harter |
| 2008/0217418 | A1 | 9/2008 | Helt et al. |
| 2008/0317292 | A1 | 12/2008 | Baker et al. |
| 2009/0050703 | A1 | 2/2009 | Lifson et al. |
| 2009/0099699 | A1 | 4/2009 | Steinberg et al. |
| 2009/0125151 | A1 | 5/2009 | Steinberg et al. |
| 2009/0171862 | A1 | 7/2009 | Harrod et al. |
| 2009/0195349 | A1 | 8/2009 | Frader-Thompson et al. |
| 2009/0240381 | A1 | 9/2009 | Lane |
| 2009/0254225 | A1 | 10/2009 | Boucher et al. |
| 2009/0259713 | A1 | 10/2009 | Blumrich et al. |
| 2009/0281885 | A1 | 11/2009 | Castelli, II et al. |
| 2009/0292375 | A1 | 11/2009 | Thompson et al. |
| 2009/0326726 | A1 | 12/2009 | Ippolito et al. |
| 2010/0019051 | A1 | 1/2010 | Rosen |
| 2010/0025483 | A1 | 2/2010 | Hoeynck et al. |
| 2010/0070084 | A1 | 3/2010 | Steinberg et al. |
| 2010/0070086 | A1 | 3/2010 | Harrod et al. |
| 2010/0070234 | A1 | 3/2010 | Steinberg et al. |
| 2010/0084482 | A1 | 4/2010 | Kennedy et al. |

(56) References Cited

U.S. PATENT DOCUMENTS

| | | |
|---|---|---|
| 2010/0088261 A1 | 4/2010 | Montalvo |
| 2010/0107109 A1 | 4/2010 | Filbeck et al. |
| 2010/0131884 A1* | 5/2010 | Shah .................. G05B 19/102 |
| | | 707/805 |
| 2010/0156608 A1 | 6/2010 | Bae et al. |
| 2010/0211224 A1 | 8/2010 | Keeling et al. |
| 2010/0262298 A1 | 10/2010 | Johnson et al. |
| 2010/0262299 A1 | 10/2010 | Cheung et al. |
| 2010/0280667 A1 | 11/2010 | Steinberg |
| 2010/0282857 A1 | 11/2010 | Steinberg |
| 2010/0289643 A1 | 11/2010 | Trundle et al. |
| 2010/0292856 A1 | 11/2010 | Fujita |
| 2010/0308119 A1 | 12/2010 | Steinberg et al. |
| 2010/0318227 A1 | 12/2010 | Steinberg et al. |
| 2010/0332373 A1 | 12/2010 | Crabtree et al. |
| 2011/0015797 A1 | 1/2011 | Gilstrap |
| 2011/0015798 A1 | 1/2011 | Golden et al. |
| 2011/0015802 A1 | 1/2011 | Imes |
| 2011/0022242 A1 | 1/2011 | Bukhin et al. |
| 2011/0046792 A1 | 2/2011 | Imes et al. |
| 2011/0046805 A1 | 2/2011 | Bedros et al. |
| 2011/0046806 A1 | 2/2011 | Nagel et al. |
| 2011/0066300 A1 | 3/2011 | Tyagi et al. |
| 2011/0077896 A1 | 3/2011 | Steinberg et al. |
| 2011/0106327 A1 | 5/2011 | Zhou et al. |
| 2011/0106328 A1 | 5/2011 | Zhou et al. |
| 2011/0153102 A1 | 6/2011 | Tyagi et al. |
| 2011/0153106 A1 | 6/2011 | Drake et al. |
| 2011/0166828 A1 | 7/2011 | Steinberg et al. |
| 2011/0184565 A1 | 7/2011 | Peterson |
| 2011/0185895 A1 | 8/2011 | Freen |
| 2011/0231028 A1 | 9/2011 | Ozog |
| 2011/0231320 A1* | 9/2011 | Irving .................... G06Q 30/08 |
| | | 713/300 |
| 2011/0238224 A1 | 9/2011 | Schnell et al. |
| 2011/0246291 A1 | 10/2011 | Paul |
| 2011/0258018 A1 | 10/2011 | Tyagi et al. |
| 2011/0264291 A1 | 10/2011 | Le Roux et al. |
| 2011/0290893 A1 | 12/2011 | Steinberg |
| 2011/0307103 A1 | 12/2011 | Cheung et al. |
| 2012/0016524 A1 | 1/2012 | Spicer et al. |
| 2012/0022709 A1 | 1/2012 | Taylor |
| 2012/0029713 A1 | 2/2012 | Spicer et al. |
| 2012/0046859 A1 | 2/2012 | Imes et al. |
| 2012/0053745 A1 | 3/2012 | Ng |
| 2012/0064923 A1 | 3/2012 | Imes et al. |
| 2012/0065783 A1 | 3/2012 | Fadell et al. |
| 2012/0065805 A1 | 3/2012 | Montalvo |
| 2012/0065935 A1 | 3/2012 | Steinberg et al. |
| 2012/0085831 A1 | 4/2012 | Kopp |
| 2012/0086562 A1 | 4/2012 | Steinberg |
| 2012/0089523 A1 | 4/2012 | Hurri et al. |
| 2012/0091804 A1 | 4/2012 | Altonen et al. |
| 2012/0095601 A1 | 4/2012 | Abraham et al. |
| 2012/0101648 A1 | 4/2012 | Federspiel et al. |
| 2012/0118989 A1 | 5/2012 | Buescher et al. |
| 2012/0123995 A1 | 5/2012 | Boot |
| 2012/0125559 A1 | 5/2012 | Fadell et al. |
| 2012/0126019 A1 | 5/2012 | Warren et al. |
| 2012/0126020 A1 | 5/2012 | Filson et al. |
| 2012/0126021 A1 | 5/2012 | Warren et al. |
| 2012/0158350 A1 | 6/2012 | Steinberg et al. |
| 2012/0165993 A1 | 6/2012 | Whitehouse |
| 2012/0176252 A1 | 7/2012 | Drew et al. |
| 2012/0191257 A1 | 7/2012 | Corcoran et al. |
| 2012/0199660 A1 | 8/2012 | Warren et al. |
| 2012/0203379 A1 | 8/2012 | Sloo et al. |
| 2012/0221150 A1 | 8/2012 | Arensmeier |
| 2012/0221151 A1 | 8/2012 | Steinberg |
| 2012/0259469 A1 | 10/2012 | Ward et al. |
| 2012/0296480 A1 | 11/2012 | Raman et al. |
| 2012/0310431 A1 | 12/2012 | Cheetham et al. |
| 2013/0024799 A1 | 1/2013 | Fadell et al. |
| 2013/0030590 A1 | 1/2013 | Prosser |
| 2013/0047010 A1 | 2/2013 | Massey et al. |
| 2013/0085614 A1 | 4/2013 | Wenzel et al. |
| 2013/0087629 A1 | 4/2013 | Stefanski et al. |
| 2013/0099010 A1 | 4/2013 | Filson et al. |
| 2013/0103621 A1 | 4/2013 | Matsuoka et al. |
| 2013/0226320 A1* | 8/2013 | Berg-Sonne ....... G06Q 10/0631 |
| | | 700/90 |
| 2013/0263034 A1 | 10/2013 | Bruck et al. |
| 2013/0274936 A1 | 10/2013 | Donahue et al. |
| 2014/0277761 A1 | 9/2014 | Matsuoka et al. |
| 2014/0277795 A1 | 9/2014 | Matsuoka et al. |
| 2014/0312128 A1 | 10/2014 | Matsuoka et al. |
| 2016/0169539 A1* | 6/2016 | Deivasigamani ..... F24H 9/2007 |
| | | 237/8 A |
| 2017/0241663 A1 | 8/2017 | Matsuoka et al. |

FOREIGN PATENT DOCUMENTS

| | | |
|---|---|---|
| CN | 102236839 A | 11/2011 |
| CN | 102375443 A | 3/2012 |
| CN | 102377182 A | 3/2012 |
| CN | 102498448 A | 6/2012 |
| CN | 102565525 A | 7/2012 |
| CN | 102812303 A | 12/2012 |
| EP | 196069 B1 | 12/1991 |
| EP | 2378483 A1 | 10/2011 |
| EP | 2407837 A2 | 1/2012 |
| EP | 2408082 A1 | 1/2012 |
| JP | 59106311 A | 6/1984 |
| JP | 01252850 A | 10/1989 |
| JP | 09298780 A | 11/1997 |
| JP | 2003-307331 A | 10/2003 |
| JP | 2004-015882 A | 1/2004 |
| JP | 2005-509989 A | 4/2005 |
| JP | 2008-109813 A | 5/2008 |
| JP | 2010-229374 A | 10/2010 |
| JP | 2011-221971 A | 11/2011 |
| JP | 2011-229374 A | 11/2011 |
| JP | 2012-503807 A | 2/2012 |
| JP | 2012-118946 A | 6/2012 |
| JP | 2012-118982 A | 6/2012 |
| JP | 2012-149839 A | 8/2012 |
| JP | 2012-527212 A | 11/2012 |
| JP | 2012-533727 A | 12/2012 |
| JP | 2013-044462 A | 3/2013 |
| JP | 5259893 B1 | 8/2013 |
| KR | 2011-0026580 A | 3/2011 |
| KR | 2012-0087887 A | 8/2012 |
| KR | 2012-0123335 A | 11/2012 |
| KR | 10-1829254 B1 | 2/2018 |
| WO | 2010-033563 A1 | 3/2010 |
| WO | 2010-083334 A1 | 7/2010 |
| WO | 2011-100736 A2 | 8/2011 |
| WO | 2011-149600 A2 | 12/2011 |
| WO | 2012-024534 A2 | 2/2012 |
| WO | 2012-027229 A2 | 3/2012 |
| WO | 2012/044946 A2 | 4/2012 |
| WO | 2012-068526 A1 | 5/2012 |
| WO | 2012-068591 A2 | 5/2012 |
| WO | 2012-092622 A2 | 7/2012 |
| WO | 2012-092625 | 7/2012 |
| WO | 2012-161993 A2 | 11/2012 |
| WO | 2014-038201 A1 | 3/2014 |
| WO | 2014-149993 A1 | 9/2014 |
| WO | 2014-152301 | 9/2014 |
| WO | 2014-172374 A1 | 10/2014 |

OTHER PUBLICATIONS

Aprilaire Electronic Thermostats Model 8355 User's Manual, Research Products Corporation, 2000, 16 pages.
Braeburn 5300 Installer Guide, Braeburn Systems, LLC, 2009, 10 pages.
Braeburn Model 5200, Braeburn Systems, LLC, 2011, 11 pages.
Ecobee Smart Si Thermostat Installation Manual, Ecobee, Apr. 3, 2012, 40 pages.
Ecobee Smart Si Thermostat User Manual, Ecobee, Apr. 3, 2012, 44 pages.

(56) References Cited

OTHER PUBLICATIONS

Ecobee Smart Thermostat Installation Manual, Jun. 29, 2011, 20 pages.
Ecobee Smart Thermostat User Manual, May 11, 2010, 20 pages.
Electric Heat Lock Out on Heat Pumps, Washington State University Extension Energy Program, Apr. 2010, pp. 1-3.
Honeywell Installation Guide FocusPRO TH6000 Series, Honeywell International, Inc., Jan. 5, 2012, 24 pages.
Honeywell Operating Manual FocusPRO TH6000 Series, Honeywell International, Inc., Mar. 25, 2011, 80 pages.
Honeywell Prestige IAQ Product Data 2, Honeywell International, Inc., Jan. 12, 2012, 126 pages.
Honeywell Prestige THX9321 and TXH9421 Product Data, Honeywell International, Inc., 68-0311, Jan. 2012, 126 pages.
Honeywell Prestige THX9321-9421 Operating Manual, Honeywell International, Inc., Jul. 6, 2011, 120 pages.
Hunter Internet Thermostat Installation Guide, Hunter Fan Co., Aug. 14, 2012, 8 pages.
Introducing the New Smart Si Thermostat, Datasheet [online]. Ecobee, Mar. 2012 [retrieved on Feb. 25, 2013]. Retrieved from the Internet: <URL: https://www.ecobee.com/solutions/home/smart-si/>, Mar. 12, 2012, 4 pages.
Lennox ComfortSense 5000 Owners Guide, Lennox Industries, Inc., Feb. 2008, 32 pages.
Lennox ComfortSense 7000 Owners Guide, Lennox Industries, Inc., May 2009, 15 pages.
Lennox iComfort Manual, Lennox Industries, Inc., Dec. 2010, 20 pages.
Lux PSPU732T Manual, LUX Products Corporation, Jan. 6, 2009, 48 pages.
NetX RP32-WIFI Network Thermostat Consumer Brochure, Network Thermostat, May 2011, 2 pages.
NetX RP32-WIFI Network Thermostat Specification Sheet, Network Thermostat, Feb. 28, 2012, 2 pages.
RobertShaw Product Manual 9620, Maple Chase Company, Jun. 12, 2001, 14 pages.
RobertShaw Product Manual 9825i2, Maple Chase Company, Jul. 17, 2006, 36 pages.
SCE Energy$mart Thermostat Study for Southern California Edison—Presentation of Study Results, Population Research Systems, Project #1010, Nov. 10, 2004, 51 pages.
SYSTXCCUIZ01-V Infinity Control Installation Instructions, Carrier Corp, May 31, 2012, 20 pages.
T8611G Chronotherm IV Deluxe Programmable Heat Pump Thermostat Product Data, Honeywell International Inc., Oct. 1997, 24 pages.
TB-PAC, TB-PHP, Base Series Programmable Thermostats, Carrier Corp, May 14, 2012, 8 pages.
The Perfect Climate Comfort Center PC8900A W8900A-C Product Data Sheet, Honeywell International Inc., Apr. 2001, 44 pages.
TP-PAC, TP-PHP, TP-NAC, TP-NHP Performance Series AC/HP Thermostat Installation Instructions, Carrier Corp. Sep. 2007, 56 pages.
Trane Communicating Thermostats for Fan Coil, Trane, May 2011, 32 pages.
Trane Communicating Thermostats for Heat Pump Control, Trane, May 2011, 32 pages.
Trane Install XL600 Installation Manual, Trane, Mar. 2006, 16 pages.
Trane XL950 Installation Guide, Trane, Mar. 2011, 20 pages.
Venstar T2900 Manual, Venstar, Inc., Apr. 2008, 113 pages.
Venstar T5800 Manual, Venstar, Inc., Sep. 7, 2011, 63 pages.
VisionPRO TH8000 Series Installation Guide, Honeywell International, Inc., Jan. 2012, 12 pages.
VisionPRO TH8000 Series Operating Manual, Honeywell International, Inc., Mar. 2011, 96 pages.
VisionPRO Wi-Fi Programmable Thermostat, Honeywell International, Inc., Operating Manual, Aug. 2012, 48 pages.
White Rodgers (Emerson) Model 1F81-261 Installation and Operating Instructions, White Rodgers, Apr. 15, 2010, 8 pages.
White Rodgers (Emerson) Model IF98EZ-1621 Homeowner's User Guide, White Rodgers, Jan. 25, 2012, 28 pages.
Allen et al., "Real-Time Earthquake Detection and Hazard Assessment by ElarmS Across California", Geophysical Research Letters, vol. 36, L00B08, 2009, pp. 1-6.
Arens et al., "Demand Response Electrical Appliance Manager-User Interface Design, Development and Testing",Poster, Demand Response Enabling Technology Development, University of California Berkeley, Retrieved from dr.berkeley.edu/dream/posters/2005_6GUiposter.pdf, 2005, 1 page.
Arens et al., "Demand Response Enabled Thermostat-Control Strategies and Interface", Demand Response Enabling Technology Development Poster, University of California Berkeley, Retrieved from dr.berkeley.edu/dream/posters/2004_11 CEC TstatPoster.pdf, 2004, 1 page.
Arens et al., "Demand Response Enabling Technology Development", Phase I Report: Jun. 2003-Nov. 2005, Jul. 27, P:/DemandRes/UC Papers/DR-Phase1 Report-Final Draf!Apr.24-26.doc, University of California Berkeley, pp. 1-108.
Arens et al., "New Thermostat Demand Response Enabling Technology", Poster, University of California Berkeley, Jun. 10, 2004, 1 page.
Akhlaghinia et al., "Occupancy Monitoring in Intelligent Environment through Integrated Wireless Localizing Agents", IEEE, 2009, 7 pages.
Akhlaghinia et al., "Occupant Behaviour Prediction in Ambient Intelligence Computing Environment", Journal of Uncertain Systems, vol. 2, No. 2, 2008, pp. 85-100.
Auslander et al., "UC Berkeley DR Research Energy Management Group", PowerPoint Presentation, DR ETD Workshop, State of California Energy Commission, Jun. 11, 2007, pp. 1-35.
Chatzigiannakis et al., "Priority Based Adaptive Coordination of Wireless Sensors and Actors", [online] Q2SWinet '06, Oct. 2, 2006 [Retrieved on Mar. 12, 2012]. Retrieved from the Internet: <URL: http://dl.acm.org/citation.cfm?id=1163681>.
Chen et al., "Demand Response-Enabled Residential Thermostat Controls", Abstract, ACEEE Summer Study on Energy Efficiency in Buildings, Mechanical Engineering Dept. and Architecture Dept., University of California Berkeley., 2008, pp. 1-24 through 1-36.
De Almeida et al., "Advanced Monitoring Technologies for the Evaluation of Demand-Side Management Programs", Energy, vol. 19, No. 6, 1994, pp. 661-678.
Deleeuw, "Ecobee WiFi Enabled Smart Thermostat Part 2: The Features Review", Retrieved from <URL: http://www.homenetworkenabled.com/content.php?136-ecobee-WiFi-enabled-Smart-Thermostat-Part-2-The-Features-review>, Dec. 2, 2011, 5 pages.
Gao et al., "The Self-Programming Thermostat: Optimizing Setback Schedules Based on Home Occupancy Patterns", In Proceedings of the First ACM Workshop on Embedded Sensing Systems for Energy-Efficiency in Buildings, Nov. 3, 2009, 6 pages.
Gevorkian, "Alternative Energy Systems in Building Design", 2009, pp. 195-200.
Hoffman et al., "Integration of Remote Meter Reading, Load Control and Monitoring of Customers' Installations for Customer Automation with Telephone Line Signaling", Electricity Distribution, 1989. CIRED 1989. 10th International Conference on, May 8-12, 1989, pp. 421-424.
Levy, "A Vision of Demand Response—2016", The Electricity Journal, vol. 19, Issue 8, Oct. 2006, pp. 12-23.
Loisos et al., "Buildings End-Use Energy Efficiency: Alternatives to Compressor Cooling", California Energy Commission, Public Interest Energy Research, Jan. 2000, 80 pages.
Lopes, "Case Studies in Advanced Thermostat Control for Demand Response", AEIC Load Research Conference, St. Louis, MO, Jul. 2004, 36 pages.
Lu et al., "The Smart Thermostat: Using Occupancy Sensors to Save Energy in Homes", In Proceedings of the 8th ACM Conference on Embedded Networked Sensor Systems, Nov. 3-5, 2010, pp. 211-224.
Martinez, "SCE Energy$mart Thermostat Program", Advanced Load Control Alliance, Oct. 5, 2004, 20 pages.

(56) References Cited

OTHER PUBLICATIONS

Matty, "Advanced Energy Management for Home Use", IEEE Transaction on Consumer Electronics, vol. 35, No. 3, Aug. 1989, pp. 584-588.
Motegi et al., "Introduction to Commercial Building Control Strategies and Techniques for Demand Response", Demand Response Research Center, May 22, 2007, 35 pages.
Mozer, "The Neural Network House: An Environmental that Adapts to it's Inhabitants", AAAI Technical Report SS-98-02, 1998, pp. 110-114.
Mozer, M. et al., "The Neurothermostat: Predictive Optimal Control of Residential Heating Systems" appearing in M. Mozer et al. *Adv. in Neural Info. Proc.Systems 9*, Cambridge, MA: MIT Press. 1997, pp. 953-959.
Peffer et al., "A Tale of Two Houses: The Human Dimension of Demand Response Enabling Technology from a Case Study of Adaptive Wireless Thermostat", Abstract, ACEEE Summer Study on Energy Efficiency in Buildings, Architecture Dept. and Mechanical Engineering Dept., University of California Berkeley., 2008, pp. 7-242 through 7-253.
Peffer et al., "Smart Comfort at Home: Design of a Residential Thermostat to Achieve Thermal Comfort, and Save Money and Peak Energy", University of California Berkeley, Mar. 2007, 1 page.
Ros et al., "Multi-Sensor Human Tracking with the Bayesian Occupancy Filter", IEEE, 2009, 8 pages.
Wong et al., "Maximum Likelihood Estimation of ARMA Model with Error Processes for Replicated Observations", National University of Singapore, Department of Economics, Working Paper No. 0217, 2002, 19 pages.
Lien et al., "Remote-Controllable Power Outlet System for Home Power Management", IEEE, Nov. 2007, pp. 1634-1641.
Wright et al., "DR ETD—Summary of New Thermostat, TempNode, & New Meter (UC Berkeley Project)", Power Point Presentation, Public Interest Energy Research, University of California Berkeley. Retrieved from: http://dr.berkeley.edu/dream/presentations/2005_6CEC.pdf, 2005, pp. 1-49.
International Search Report and Written Opinion dated Sep. 15, 2014 in International Patent Application No. PCT/US2014/034213, all pages.
International Preliminary Report on Patentability dated Oct. 29, 2015 in International Patent Application No. PCT/US2014/034213, all pages.
International Search Report and Written Opinion dated Oct. 9, 2014 in International Patent Application No. PCT/US2014/027185, all pages.
International Preliminary Report on Patentability dated Sep. 15, 2015 in International Patent Application No. PCT/US2014/027185, all pages.
Invitation to Pay Additional Fees and Partial Search Report dated Aug. 4, 2014 in International Patent Application No. PCT/US2014/027185, all pages.
Non-Final Office Action dated Feb. 4, 2016 in U.S. Appl. No. 13/842,213, all pages.
Final Office Action dated Jun. 16, 2016 in U.S. Appl. No. 13/842,213, all pages.
Notice of Publication dated Sep. 18, 2014 in U.S. Appl. No. 13/866,199, 1 page.
Final Office Action dated Apr. 22, 2016 in U.S. Appl. No. 13/866,199, all pages.
Non-Final Office Action dated Dec. 16, 2016 in U.S. Appl. No. 13/866,199, all pages.
Non-Final Office action dated Jun. 19, 2015 in U.S. Appl. No. 13/866,199, all pages.
Yang, Xiaoping "Study on Optimization Control Technique of Heating, Ventilation and Air-conditioning," Chinese Doctoral Dissertations & Master's Theses Full-text Database (Master), Engineering Science and Technology II, No. 5, C038-269, 31 pages.
Extended European Search Report dated Jan. 5, 2017 in European Patent Application No. 14767804.9 all pages.
Notice of European Publication Number dated Dec. 23, 2015 in European Patent Application No. 14767804.9, 1 page.
Office action dated Nov. 27, 2019 in European Patent Application No. 14767804.9, all pages.
First Examination Report dated May 12, 2017 in Australian Patent Application No. 2014254089, all pages.
Office Action dated Apr. 3, 2018 in Japanese Patent Application No. 2016-509032, all pages.
Notice of Decision to Grant dated Nov. 20, 2018 in Japanese Patent Application No. 2016-509032, all pages.
Notice of Publication dated Aug. 22, 2016 in Chinese Patent Application No. 2016-509032, 1 page.
First Examination Report dated Mar. 2, 2018 in Japanese Patent Application No. 2014237606, all pages.
Second Examination report dated Jun. 22, 2018 in Australian Patent Application No. 2014237606, all pages.
Office Action dated Jun. 1, 2017 in Chinese Patent Application No. 201480027939.5, all pages.
Notice of Decision to Grant dated Aug. 6, 2018 in Chinese Patent Application No. 201480027939.5, all pages.
Office Action dated Feb. 12, 2018 in Chinese Patent Application No. 201480027939.5, all pages.
Chinese Notification of Publication of Patent Application for Invention and Entering the Substantive Examination Proceeding dated Mar. 9, 2016 in Chinese Patent Application No. 201480027939.5, 114 pages.
International Preliminary Report on Patentability dated Sep. 24, 2015 in International Patent Application No. PCT/US2014/021758, all pages.
International Search Report and Written Opinion dated Jul. 30, 2014 in International Patent Application No. PCT/US2014/021758, all pages.
Non-Final Office action dated Jul. 17, 2015 in U.S. Appl. No. 13/866,635, all pages.
Non-Final Office action dated Dec. 12, 2016 in U.S. Appl. No. 13/866,635, all pages.
Final Office action dated Jan. 14, 2016 in U.S. Appl. No. 13/866,635, all pages.
Notice of Publication dated Jan. 6, 2016 in Chinese Patent Application No. 201480027888.6, 1 page.
Office action dated Jun. 5, 2017 in Chinese Patent Application No. 201480027888.6, all pages.
Office Action dated Feb. 23, 2018 in Chinese Patent Application No. 201480027888.6, all pages.
Notice of Decision to Grant dated Aug. 6, 2018 in Chinese Patent Application No. 201480027888.6, all pages.
Office action dated Mar. 6, 2018 in Japanese Patent Application No. 2016-500825, all pages.
Notice of Allowance dated Jul. 31, 2018 in Japanese Patent Application No. 2016-500825, all pages.
Notice of Publication dated Aug. 8, 2016 in Japanese Patent Application No. 2016-500825, all pages.
International Published Application dated Sep. 25, 2014 in International Patent Application No. PCT/US2014/027185, 1 page.
Notice of Acceptance dated Mar. 2, 2018 in Australian Patent Application No. 2014239934, all pages.
First Examination Report dated Feb. 28, 2018 in Australian Patent Application No. 2014239934, all pages.
Notice of European Publication Number dated Dec. 23, 2015 in European Patent Application No. 14770648.5, 1 page.
Office Action dated Aug. 28, 2019 in European Patent Application No. 14770648.5, all pages.
Office action dated Jun. 7, 2018 in European Patent Application No. 14770648.5, all pages.
Extended European Search Report dated Oct. 12, 2016 in European Patent Application No. 14770648.5, all pages.
Notice of Publication dated Aug. 25, 2016 in Japanese Patent Application No. 2016-502360, 1 page.
Office action dated Feb. 13, 2018 in Japanese Patent Application No. 2016-502360, all pages.
Office action dated Aug. 28, 2018 in Japanese Patent Application No. 2016-502360, all pages.

(56) References Cited

OTHER PUBLICATIONS

Notice of Allowance dated Apr. 2, 2019 in Japanese Patent Application No. 2016-502360, all pages.
First Examination Report dated Mar. 15, 2019 in Australian Patent Application No. 2018203856, all pages.
Notice of Acceptance dated Sep. 6, 2019 in Australian Patent Application No. 2018203856, all pages.
Notice of Publication dated Mar. 20, 2019 in Chinese Patent Application No. 201811202373.1, 1 page.
Office action dated Mar. 5, 2020 in Chinese Patent Application No. 201811202373.1, all pages.
Notice of Publication dated Feb. 3, 2016 in Chinese Patent Application No. 201480029063.8, 1 page.
Office action dated Nov. 27, 2017 in Chinese Patent Application No. 201480029063.8, all pages.
Office action dated Jul. 25, 2018 in Chinese Patent Application No. 201480029063.8, all pages.
Office Action dated May 15, 2017 in Chinese Patent Application No. 201480029063.8, all pages.
Office Action dated Aug. 24, 2016 in Chinese Patent Application No. 201480029063.8, all pages. English translation.
Notice of Decision to Grant dated Dec. 17, 2018 in Chinese Patent Application No. 201480029063.8, all pages.
Notice of European Publication Number dated Jan. 27, 2016 in European Patent Application No. 14784686.9, 1 page.
Extended European Search Report dated Nov. 25, 2016 in European Patent Application No. 14784686.9, all pages.
Office action dated Apr. 19, 2018 in European Patent Application No. 14784686.9, all pages.
First Examination Report dated Jan. 25, 2019 in Australian Patent Application No. 2018200113, all pages.
Notice of Allowance dated Mar. 5, 2019 in U.S. Appl. No. 15/458,646, all pages.
Non-Final Office action dated Nov. 2, 2018 in U.S. Appl. No. 15/458,646, all pages.
Notice of Allowance dated May 22, 2019 in U.S. Appl. No. 15/458,646, all pages.
Non-Final Office action dated May 9, 2019 in U.S. Appl. No. 15/799,753, all pages.
Extended European Search Report dated Sep. 13, 2019 in European Patent Application No. 19190708.8, all pages.
Notice of Decision to Grant dated Feb. 25, 2020 in Japanese Patent Application No. 2019-102661, 10 pages.
Notice of Reason for Refusal dated Nov. 12, 2019 in Japanese Patent Application No. 2019-102661, all pages.
Office action dated Mar. 4, 2020 in Japanese Patent Application No. 2018-238512, 10 pages.
Office Action dated Mar. 17, 2020 in Canadian Patent Application No. 2,902,271, all pages.
Office Action dated May 19, 2020 in Chinese Patent Application No. 201811201918.7, all pages.
First Examination Report dated Jan. 21, 2020 in Australian Patent Application No. 2019201286, all pages.
Final Office Action dated Aug. 21, 2019 in U.S. Appl. No. 15/805,312, all pages.
Non-Final Office action dated Feb. 25, 2019 in U.S. Appl. No. 15/805,312, all pages.
Notice of Allowance dated Mar. 6, 2020 in U.S. Appl. No. 15/805,312, 4 pages.
Supplemental Notice of Allowance dated Mar. 26, 2020 in U.S. Appl. No. 15/805,312, 16 pages.
Office Action dated Apr. 9, 2020 in Canadian Patent Application No. 2,902,183, all pages.
Notification of Reason for Refusal dated May 29, 2020 in Korean Patent Application No. 2015-7033149, all pages.
Notice of Publication dated Jul. 22, 2019 in Chinese Patent Application No. 201910140868.4, 1 page.
First Examination Report dated Jun. 3, 2020 in related Australian application No. 2019204048, 3 pages.
First Examination Report dated Dec. 8, 2020 in Australian Patent Application No. 2019279954, 5 pages.

* cited by examiner

US 11,739,968 B2

CONTROLLING AN HVAC SYSTEM USING AN OPTIMAL SETPOINT SCHEDULE DURING A DEMAND-RESPONSE EVENT

RELATED APPLICATIONS

This application is a continuation of U.S. application Ser. No. 15/805,312, filed Nov. 7, 2017, which is incorporated here by reference. U.S. application Ser. No. 15/805,312 is a continuation of U.S. application Ser. No. 13/866,635, filed Apr. 19, 2013, which is incorporated here by reference. U.S. application Ser. No. 13/866,635 is a continuation-in-part of U.S. application Ser. No. 13/842,213, filed Mar. 15, 2013, which is incorporated here by reference.

FIELD

This patent specification relates to systems, apparatus, methods, and related computer program products for controlling an HVAC system during a demand-response event. More particularly, this patent specification relates to techniques for intelligently selecting and/or optimizing a control trajectory of an HVAC system during a demand-response event.

BACKGROUND

Utility companies face ongoing challenges with consistently satisfying the demand for electricity. Facilities for generating electricity are typically well-suited for supplying constant amounts of electricity. However, consumers' demand for electricity is often quite the opposite in that the aggregate electricity demand varies significantly over the course of the delay. The daily variance results in one or more 'peak' demand times or periods in which demand on the utility company is greatest, and 'non-peak' demand times or periods in which demand on the utility company is reduced.

The variance in demand over the course of a day may be impacted by a number of factors such as weather and living patterns. For example, during the summertime, demand generally tends to increase as the outside temperature increases to levels considered uncomfortable as consumers increase their usage of high consumption appliances such as air conditioning systems. Demand also generally tends to vary based on work habits, where demand peaks when people leave for work and again when people return from work. During some points in the year, such as during extremely hot days, demand may reach extreme peaks.

Utility companies have a variety of options for dealing with the variable demand for energy. They may, for example, increase their ability to satisfy higher peak demands by building additional power plants. However, the costs of doing so are often prohibitive and building such plants is often inefficient as the added capacity is used for only short durations throughout the year. They may buy additional capacity from other utility company's or energy providers, but doing so is also costly as such company's may charge a premium and the energy transfer from those other companies is often less efficient. Instead of increasing supply, utility companies may also address peak demands by reducing the demand via load shedding.

Load shedding is a technique in which the utility company reduces the amount of energy demanded by its consumers during a period of peak demand. A variety of load shedding techniques are in use today, most of which are based on the utility company directly controlling the cooling systems of its consumers. During such peak demand periods the utility company controls the cooling systems to reduce their energy demand. Such events, which most often take place on very hot days in the mid-to-late afternoon and have a duration in the general range of two to six hours, are referenced in the literature by a variety of different names such as load shedding events, load shifting events, and demand response events. The goal of the utility company in carrying out such events is not necessarily to reduce the total amount of energy consumed over the whole day, but rather to reduce the peak demand during that particular two-to-six hour interval, i.e., during the load shedding interval or demand-response interval. Typically, the end result is that the energy that would have been consumed during the load shedding interval is instead consumed in the hours subsequent to the load shedding interval, as the cooling systems of the participating homes work to regain their cooler normal setpoint temperature. Such control, of course, often creates an inconvenience to the consumers who sign up to participate in such a 'demand response program' as their cooling system may not cool their residence as expected. However, in return for this inconvenience the consumer is often granted certain benefits, such as more favorable rates for energy consumed outside of the peak demand period.

One common load shedding technique, often referred to as direct load control, involves the periodic on-and-off cycling of power to the cooling system of each participating customer under the direct control of the utility during the load shedding period. In such a method, a remotely controllable switch is installed on the cooling system of each customer and is operable to disconnect power to the cooling system under the direct control of the utility company. The power to the cooling system may then be directly controlled by the utility company such that it is turned off for regular, fixed time intervals during a peak demand period. Consumers may express some degree of animosity towards such a technique, however, as direct load control results in a lack of control by the consumer of their cooling system, and often results in inside temperatures that are found to be uncomfortable by the consumer. Deficiencies in the communication link between the utility company and the switch can worsen the problem, with lost commands from the utility company to the switch to reconnect power to the cooling system resulting in the cooling system undesirably remaining in a disconnected state. Such problems have resulted in some consumers attempting to obviate the control on their cooling system while still attaining the benefits of participating in the demand response program by bypassing the remotely controlled switch. As a result, while such "cheaters" may acquire their desired individual cooling system control, the effectiveness of the overall demand response program can be undermined.

Another known load shedding technique involves remote control of the setpoint temperature of the thermostat of each participating customer by the utility, wherein the utility sends a common setback value to the thermostats of the participating customers. During the load shedding period, the participating thermostats will control the indoor temperature to a temperature setpoint value that is higher than the normally scheduled temperature setpoint value by the setback amount. This control by the utility company will typically result in an ambient temperature that is less comfortable than what the consumers would have otherwise experienced, but provides the benefit of both energy and cost savings. While providing the potential for increased comfort and acceptance over direct on/off cycling of the power to the cooling system by the utility, this technique can have disadvantages including lack of control by the consumer and the utility company's ability to set the setback value to any value the utility company deems suitable. Moreover, the use of a single setback value for all consumers fails to recognize differences in perceptions in comfort, differences in thermal characteristics of residences, differences in cooling capacities of the cooling systems, and other differences among the base of participating customers.

U.S. Patent Publication No. 2012/0053745 to Howard Ng discusses a system and method for establishing load control during a load shedding event. Specifically, Ng discusses a technique that allows a customer or utility to control a maximum temperature rise under a direct load control program. The customer may set a comfort range on their thermostat that indicates a range of temperatures from a desired temperature that the customer is comfortable with. During a load shedding event, in a hot weather example, a switch on a space conditioning load is activated so that the space conditioning load undergoes direct load control (i.e., fixed-width duty cycling). The space conditioning load undergoes direct load control until the indoor temperature exceeds the upper value of the comfort range, at which point control will be transferred from direct load control to temperature setback control. One or more issues arise in relation to each of the above-described load shedding methods that is at least partially addressed by one or more of the embodiments described herein. By way of example, although the above described methods of direct load control, temperature setback control, and direct load control followed by temperature setback control will generally result in some amount of reduced energy use during the load shedding event across the base of participating customers, such "one-size-fits-all" approaches to the customer base can result in substantial missed opportunities for more effective load shifting and reduced customer inconvenience. By way of example and not by way of limitation, such issues and/or missed opportunities can arise with respect to one or more of: predicting with greater certainty the impact of a particular load shedding strategy for certain groups or subgroups of participating customers; increasing the tolerability and acceptance of load shedding programs such that more customers will be willing to participate; optimizing the load shedding strategy for particular groups or subgroups of customers in a manner that (i) reduces the amount of customer discomfort per unit of shifted energy demand, and/or (ii) increases the amount of shifted energy demand per "unit" of customer discomfort for those groups or subgroups; more readily identifying the groups or subgroups of customers who would be the best candidates for participation in any particular load shedding event; and more readily assessing the effectiveness of preceding load shifting event strategies for particular groups or subgroups of customers such that future load shifting events are better optimized. Other issues arise as would be apparent to one skilled in the art upon reading the present disclosure.

BRIEF SUMMARY

Various methods for carrying out demand response (DR) events are disclosed. According to one embodiment, a method for carrying out a DR event via an intelligent, network-connected thermostat associated with a structure, includes a variety of operations. Such operations include identifying a DR event that defines a DR event period, and determining an optimized control trajectory of a heating, ventilation, and air conditioning (HVAC) system to be in effect during the DR event period that minimizes a cost function. The cost function may be a combination of a variety of factors, such as a first factor representative of a total energy consumption during the DR event period, a second factor representative of a metric of occupant discomfort, and a third factor representative of deviations of a rate of energy consumption over the DR event period. The operations may further include controlling the HVAC system in accordance with the determined optimized control trajectory.

In some embodiments, the disclosed methods may further include operations such as determining a setpoint temperature profile over the DR event period. Such a determination may include a variety of sub-operations, such as calculating a setpoint temperature profile over the DR event period based on an expected indoor temperature trajectory, and identifying peaks and troughs of the calculated setpoint temperature profile. In some embodiments, methods may also include causing setpoint temperatures defined by the setpoint temperature profile to be displayed to a user of the HVAC system.

In some embodiments, determining an optimized control trajectory may include a variety of operations. For example, such a determination may include generating a plurality of candidate parameter sets, each parameter set characterizing an associated candidate setpoint schedule for the DR event. Such a determination may also include identifying an optimal one of the plurality of candidate parameter set, the optimal parameter set being optimal in that it minimizes the cost function when the associated optimal setpoint schedule is applied as an input to a predictive model-based simulation of the HVAC system.

A variety of thermostats are also disclosed. According to some embodiments, an intelligent network-connected thermostat for controlling an operation of an HVAC system in a smart home environment is disclosed. The thermostat may include a variety of components. For example, the thermostat may include HVAC control circuitry operable to actuate one or more elements of the HVAC system, and one or more sensors for measuring characteristics of the smart home environment. The thermostat may also include a processor coupled to the HVAC control circuitry and the one or more sensors, which may be operable to cause the thermostat to perform a variety of operations. Such operations may include, for example, identifying a DR event that defines a DR event period, and determining an optimized control trajectory of an HVAC system to be in effect during the DR event period that minimizes a cost function. The cost function may be a combination of factors, such as a first factor representative of a total energy consumption during the DR event period, a second factor representative of a metric of occupant discomfort, and a third factor representative of deviations of a rate of energy consumption over the DR event period. The operations may also include controlling the HVAC system in accordance with the determined optimized control trajectory.

In some embodiments, the processor may be further operable to cause the thermostat to perform additional operations. Such operations may include determining whether the HVAC system should be controlled in accordance with a different control trajectory, and upon determining that the HVAC system should be controlled in accordance with a different control trajectory: identifying a subsequent control trajectory, and controlling the HVAC system in accordance with the subsequent control trajectory.

Such operations may also include monitoring an indoor temperature of the structure, comparing the monitored indoor temperature of the structure to a predicted indoor temperature of the structure, and performing a variety of operations upon determining that the monitored indoor temperature is different from the predicted indoor temperature of the structure by at least a certain amount. Such operations may include, for example, determining a default control trajectory, and controlling the HVAC system in accordance with the default control trajectory.

Such operations may also include monitoring a state of the HVAC system, comparing the monitored state of the HVAC system to a predicted state of the HVAC system, and performing a variety of operations upon determining that the monitored indoor temperature is different from the predicted indoor temperature of the structure by at least a certain amount. Such operations may include, for example, determining a newly optimized control trajectory that minimizes the cost function, and controlling the HVAC system in accordance with the newly optimized control trajectory.

Computer-readable storage mediums are also disclosed. According to some embodiments, a tangible non-transitory computer-readable storage medium including instructions that, when executed by a computer processor, cause the computer processor to perform operations is disclosed. Such operations may include identifying a DR event that defines a DR event period, and determining an optimized control trajectory of a heating, ventilation, and air conditioning (HVAC) system to be in effect during the DR event period that minimizes a cost function. The cost function may include, for example, a first factor representative of a total energy consumption during the DR event period, a second factor representative of a metric of occupant discomfort, and a third factor representative of deviations of a rate of energy consumption over the DR event period. The operations may also include controlling the HVAC system in accordance with the determined optimized control trajectory.

In some embodiments, the instructions also cause the computer processor to perform additional operations. Such additional operations may include determining an original control trajectory of the HVAC system, comparing the optimized control trajectory to the original control trajectory, identifying similarities between the optimized control trajectory and the original control trajectory based on the comparison, and for portions of the optimized control trajectory that are similar to the original control trajectory, causing temperature setpoints defined by the original control trajectory to be displayed to a user of the HVAC system.

For a more complete understanding of the nature and advantages of embodiments of the present invention, reference should be made to the ensuing detailed description and accompanying drawings. Other aspects, objects and advantages of the invention will be apparent from the drawings and detailed description that follows. However, the scope of the invention will be fully apparent from the recitations of the claims.

DETAILED DESCRIPTION

Figure 1:
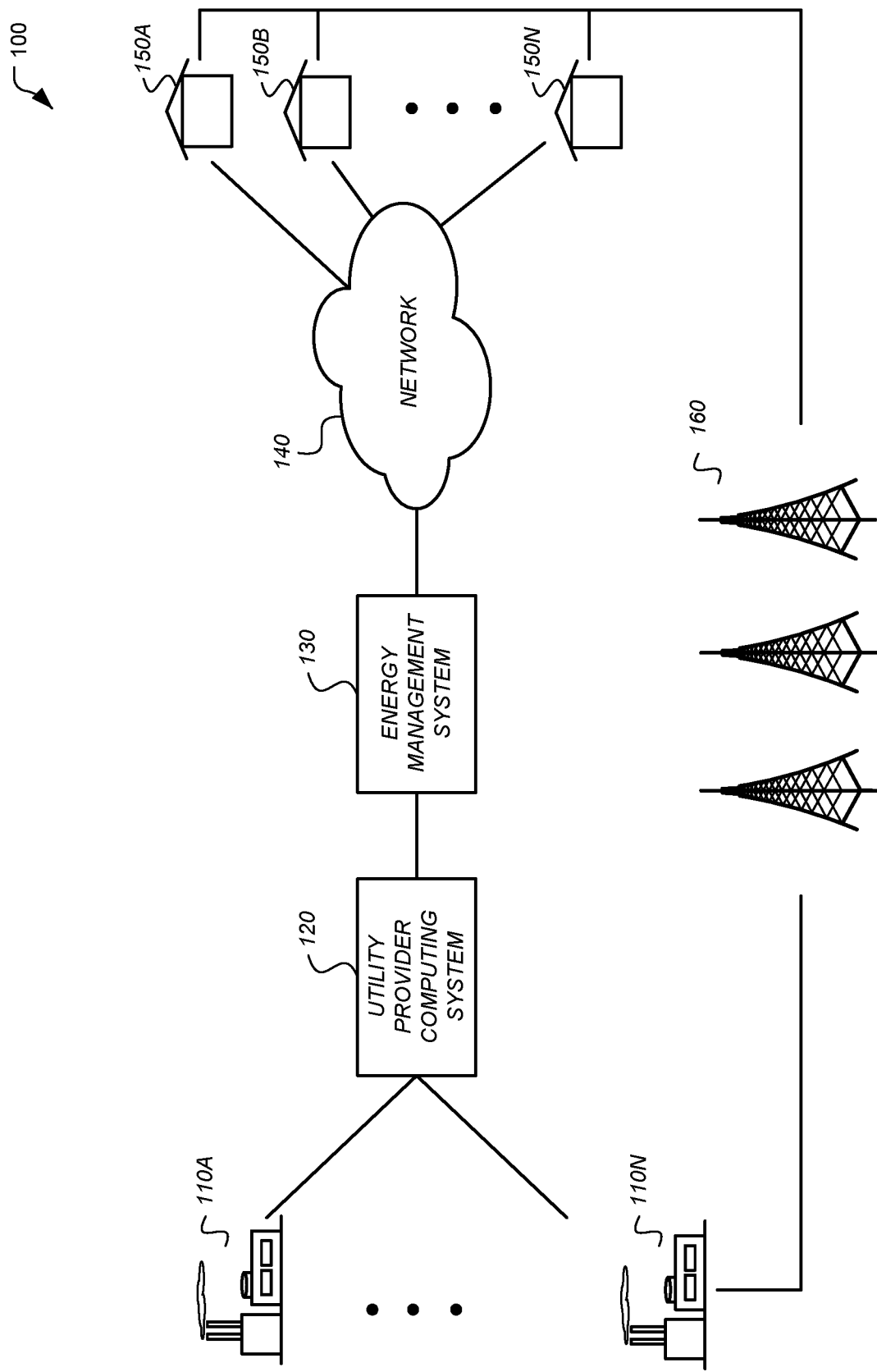
FIG. 1 depicts a system for implementing demand-response programs and event management according to an embodiment.

Embodiments of the present invention generally relate to techniques for controlling an HVAC system during a demand-response event. The entities in a system for controlling an HVAC system during a demand-response event typically include a utility provider that provides electrical or other forms of energy from a power source (e.g., an electrical generator) to individuals' homes or businesses. The individuals typically pay for the amount of energy they consume on a periodic, e.g., monthly, basis. In many embodiments an energy management system is disposed between the utility provider and the individuals. The energy management system operates to intelligently and effectively shift energy consumption of the individuals from one particular time period to other time periods. Such energy shifting is usually performed so as to shift energy consumption from a high energy cost period to a low energy cost period. In the case of DR events, energy is shifted from the DR event period to time periods outside of the DR event period. In some cases, such energy shifting may be motivated by an effort to reduce peak loads on the power grid. In other cases, such energy shifting may be motivated by a utility company's desire to sell energy supply to another utility company during a particular (e.g., high cost) period rather than to that utility company's own customers.

In either case, in many embodiments the end user (i.e., energy consumer) may be provided with an unprecedented level of control as to how their energy consumption devices (e.g., their HVAC system) are controlled during a DR event period. The energy consumer may select minimum disturbances to occupant discomfort which may result in minimal reductions in energy consumption, or may select maximum reductions in energy consumption which may result in greater disturbances to occupant discomfort, or may select something in between. Such a choice may be made prior to the DR event beginning, or during the DR event period, and in some cases may be modified during the DR event. Based on the user's choice, the most suitable HVAC control trajectory may be generated to attain such user defined objectives. Further, in many embodiments, the most suitable HVAC control trajectory may optimize a variety of HVAC control characteristics, such as the duration of a pre-cooling period, an amount of temperature setback applicable throughout the DR event period, and a maximum duty cycle of the HVAC. The independent and combined control of such HVAC control characteristics is further described in commonly assigned U.S. Ser. No. 13/842,213 (Ref. No. NES0253-US), filed Mar. 15, 2013, the entire contents of which are incorporate by reference herein in their entirety for all purposes, where embodiments described herein include techniques for determining the optimum selection of such HVAC control characteristics based on a plethora of data including but not limited to user preferences of reductions in energy consumption vs. comfort.

The energy management system according to many embodiments includes an intelligent, network-connected thermostat located at an individual's home(s) or business(es). Such a thermostat can acquire various information about the residence, such as a thermal retention characteristic of the residence, a capacity of an HVAC associated with the residence to cool or heat the residence, a likelihood of the residence being occupied (via occupancy sensors that, over time, can build an occupancy probability profile), a forecasted weather, a real-time weather, a real-time occupancy, etc. Moreover, the thermostat can be programmed by its users or may learn, over time, the preferences and habits of its users to set scheduled temperature setpoints. In exemplary embodiments, a population of such network-connected thermostats associated with a respective population of individual homes and businesses is configured to communicate with one or more central servers managed by one or more cloud service providers. Each network-connected thermostat is associated with one or more accounts managed by the cloud service provider(s), and data is sent back and forth as needed between each network-connected thermostat and the central server(s) for providing a variety of advantageous functionalities such as facilitating remote control, reporting weather data, reporting HVAC control data and status information, and providing the centralized and/or partially centralized control and data communications useful for carrying out the DR-related, time-of-use (TOU)-related, and/or real-time pricing functionalities described herein.

It is to be appreciated that although some embodiments herein may be particularly suitable and advantageous for commercial scenarios in which (i) the cloud service provider(s) associated with the population of network-connected thermostats is/are also the provider(s) of the described energy management system, (ii) the provider(s) of the energy management system are separate and distinct business entities from the utilities themselves, and (iii) the energy management system is provided as a value-added service to the utilities, the scope of the present description is in no way limited to such scenarios. In other applicable scenarios, for example, all of the elements can be provided by the utility. In other applicable scenarios, some of the elements can be provided by the utility while other elements can be provided by a governmental entity or by miscellaneous combinations of disparate cooperating businesses or consortia. Prior to a DR event, based on a wealth of information the energy management system possesses regarding the residences it is managing, the energy management system can effectively predict how much energy a residence is likely to consume over an given period, such as over a DR event. Moreover, given the wealth of information regarding the residences, the energy management system may also generate variations to the residence's original thermostat setpoints that can be implemented during the DR event period. The variations can be made so that that the residence consumes less energy over the DR event period. Further yet, because of this wealth of information the energy management system has regarding the residences, the energy management system may also accurately predict the amount of energy likely to be reduced over the DR event period or, in other words, shifted from the DR event period to one or more time periods outside (e.g., shouldering) the DR event period.

The described provisions for such energy consumption prediction and management bring about many advantages as described further herein. For example, not only do they allow the energy management system to effectively manage the energy consumption of a number of connected residences, but they also allow the energy management system to intelligently select a subset of residences from a large pool for participation in DR programs or events. The physical characteristics of residences, geographical characteristics of residences, and habitual tendencies of occupants of those residents vary widely across regions, and thus the potential energy savings/shifting also varies widely. The energy management system disclosed herein may intelligently choose the participants in an energy savings program to maximize efficiency and minimize costs. Various energy management systems are further described in commonly assigned U.S. Ser. No. 13/842,213, supra.

As the energy management system disclosed herein provides advantageous insight into energy-related characteristics of various residences on both individual and aggregate levels, the energy management system may also provide portals so that other interested parties, such as utility companies, may similarly have access to such information. As it is generally in the interests of the utility company to reduce energy consumption over a particular time period, the utility company similarly has interests in accessing such energy-related characteristics of the various residences individually and in the aggregate so as to more efficiently and effectively generate and manage DR events. Accordingly, in some embodiments, a utility portal may be provided that enables the utility provider access to consumer-level energy-related information at a variety of levels of detail and complexity, for facilitating both economically smart and environmentally responsible decision making on resource planning and utilization. Various utility portals are further described in commonly assigned and concurrently filed U.S. Ser. No. 13/866,199, titled "Utility Portals For Managing Demand-Response Events", the entire contents of which are incorporate by reference herein in their entirety for all purposes, and U.S. Ser. No. 13/842,213, supra.

It should also be appreciated that while many embodiments described herein refer to an energy management system including an intelligent, network-connected thermostat that is operable to reduce (during a certain time period) or otherwise shift (from one time period to another time period) energy consumption during a period identified as a "demand-response event period", similar techniques may also be applied during a "supply-response event period", where a supply-response event period is indicative of a period of excess energy supply (in contrast to insufficient supply) during which it is desired to increase energy consumption (in contrast to decrease energy consumption). During such an event period, instead of optimizing control trajectories to minimize energy consumption, the opposite may be implemented whereby control trajectories are optimized to maximize energy consumption. In some embodiments, excess energy supply may include energy supplied by an energy consumer by one or more energy generating elements, such as solar panels, wind turbines, gas-powered electric generators, or other source(s) of electrical power. In situations where energy is supplied by the energy consumer (e.g., during a sunny period), such a period may be considered a "supply-response event period".

The specifics of these and other embodiments are further disclosed herein, and a further understanding of which can be appreciated with reference to the figures. Turning now then to the Figures, FIG. 1 depicts a system 100 for managing demand-response programs and events according to an embodiment. System 100 includes a plurality of electrical power generators 110A-110N, a utility provider computing system 120, an energy management system 130, a communication network 140, a plurality of energy consumer residences 150A-150N, and a power distribution network 160.

Electrical power generators 110A-110N are operable to generate electricity or other type of energy (e.g., gas) using one or more of a variety of techniques known in the art. For example, electrical power generators 110A-110N may include hydroelectric systems, nuclear power plants, fossil-fuel based power plants, solar plants, wind plants, gas processing plants, etc. The amount of electricity that may be generated at any given time may limited to some maximum energy supplied that is determined by the generators 110A-110N. Further, the electrical power generators 110A-110N may be owned and managed by a utility provider implementing the utility provider computing system 120, or may be owned and/or managed by one or more third party entities that contract with the utility provider to provide source energy to customers of the utility provider.

Utility provider computing system 120 is a computing system operable to communicate with one or more of the electrical power generators 110A-110N, the energy management system 130, and in some embodiments electronic systems in one or more of the residences 150A-150N. The utility provider associated with the utility provider company system 120 typically manages the distribution of electricity from the electrical power generators 110A-110N to energy consumers at the residences 150A-150N. This management includes ensuring the electricity is successfully communicated from the power generators 110A-110N to the residences 150A-150N, monitoring the amount of energy consumption at each of the residences 150A-150N, and collecting fees from occupants of the residences 150A-150N in accordance with the their respective monitored amount of energy consumption. The utility provider computing system 120 may perform one or more of the operations described herein, and may include a variety of computer processors, storage elements, communications mechanisms, etc. as further described herein and as necessary to facilitate the described operations.

Energy management system 130 is a computing system operable to intelligently and efficiently manage the energy consumption at one or more of the residences 150A-150N while optionally providing reporting and control mechanisms to the utility provider computing system 120. The energy management system 130 may be operable to engage in real-time two-way communications with electronic devices associated with the residences 150A-150N via the network 140, as well as in engage in real-time two-way communications with the utility provider computing system 120. In one particular embodiment, the energy management system 130 may be operable to reduce the aggregate amount of energy consumed at the residences 150A-150N so that the aggregate energy demand does not exceed the maximum energy supply limits of the power generators 110A-110N. Such reductions may be achieved during any suitable time period through the day. For example, such reductions may be achieved during a demand-response (DR) event communicated by the utility provider computing system 120. The energy management system 130 may perform one or more of the operations described herein, and may include a variety of computer processors, storage elements, communications mechanisms, etc. as further described herein and as necessary to facilitate the described operations.

Network 140 is any suitable network for enabling communications between various entities, such as between one or more components of the energy management system 130 and one or more electronic devices associated with one or more of the residences 150A-150N. Such a network may include, for example, a local area network, a wide-area network, a virtual private network, the Internet, an intranet, an extranet, a public switched telephone network, an infra-red network, a wireless network, a wireless data network, a cellular network, or any other such wired or wireless network(s) or combination(s) thereof. The network 140 may, furthermore, incorporate any suitable network topology. Network 140 may utilize any suitable protocol, and communication over the network 140 may be enabled by wired or wireless connections, and combinations thereof.

Residences 150A-150N are a variety of structures or enclosures that are associated with energy consumption. The structures may span a variety of structure types, such as private residences, houses, apartments, condominiums, schools, commercial properties, single or multi-level office buildings, and/or manufacturing facilities. A number of examples described herein refer to the structure as being a private residence in the form of a house, but embodiments are not so limited as one skilled in the art would understand that the techniques described herein could equally be applicable to other types of structures. It is to be appreciated that, while some embodiments may be particularly advantageous for residential living scenarios, the scope of the present teachings is not so limited and may equally be advantageous for business environments, school environments, government building environments, sports or entertainment arenas, and so forth. Thus, while many of the descriptions below are set forth in residential living context, it is to be appreciated that this is for purposes of clarity of description and not by way of limitation.

The residences 150A-150N typically include one or more energy consumption devices, which could be electrical energy consumption devices such as televisions, microwaves, home audio equipment, heating/cooling systems, laundry machines, dishwashers, etc. Similarly, energy consumption devices could include one or more other types of energy consumption devices such as gas consumption devices. For example, the residences 150A-150N may include a natural gas (air/water/etc.) heater, stove, fireplace, etc. The residences 150A-150N in many embodiments include one or more control devices that control energy consumption by one or more of the aforementioned energy consumption devices. For example, they may include an intelligent, network connected thermostat that is operable to control the thermal environment of the residence. The thermostats may be considered to be part of the energy management system 130 in that much of the processing subsequently described herein may be performed by computing systems at the energy management system 130 or by the thermostats themselves. Alternatively, the thermostats may be considered to be separate from the energy management system 130 due to their remote geographical location with respect to other components of the energy management system 130. In either case, electronic devices associated with the residences 150A-150N may perform one or more of the operations described herein, and may include a variety of computer processors, storage elements, communications mechanisms, etc. as further described herein and as necessary to facilitate the described operations. While most embodiments are described in the context of situations where it is desired to reduce the temperature inside of the structure (e.g., during a hot summer), similar principles apply (just applied in the opposite) in situations where it is desired to increase the temperature inside of the structure (e.g., during a cold winter). For some embodiments, some or all of the intelligent, network-connected thermostats may be the same as or similar in functionality to the NEST LEARNING THERMOSTAT® available from Nest Labs, Inc. of Palo Alto, Calif.

Power distribution network 160 is any suitable network for transferring energy from one or more of the electrical power generators 110A-110N to one or more of the residences 150A-150N. In an electrical distribution network, power distribution network 160 may include a variety of power lines, substations, pole-mounted transformers, and the like as known in art the for carrying electricity from the electrical power generators 110A-110N to the residences 150A-150N. In a gas distribution network, power distribution network 160 may include a variety of compressor stations, storage elements, pipes, and the like for transporting natural or other types of energy producing gas from the power generators 110A-110N (in this embodiment, gas wells and/or processing plants) to the residences 150A-150N.

System 100 in certain embodiments is a distributed system for managing demand-response programs and events utilizing several computer systems and components that are interconnected via communication links using one or more computer networks or direct connections. However, it will be appreciated by those skilled in the art that such a system could operate equally well in a system having fewer or a greater number of components than are illustrated in FIG. 1. Thus, the depiction of system 100 in FIG. 1 should be taken as being illustrative in nature, and not as limiting the scope of the present teachings.

Figure 2:
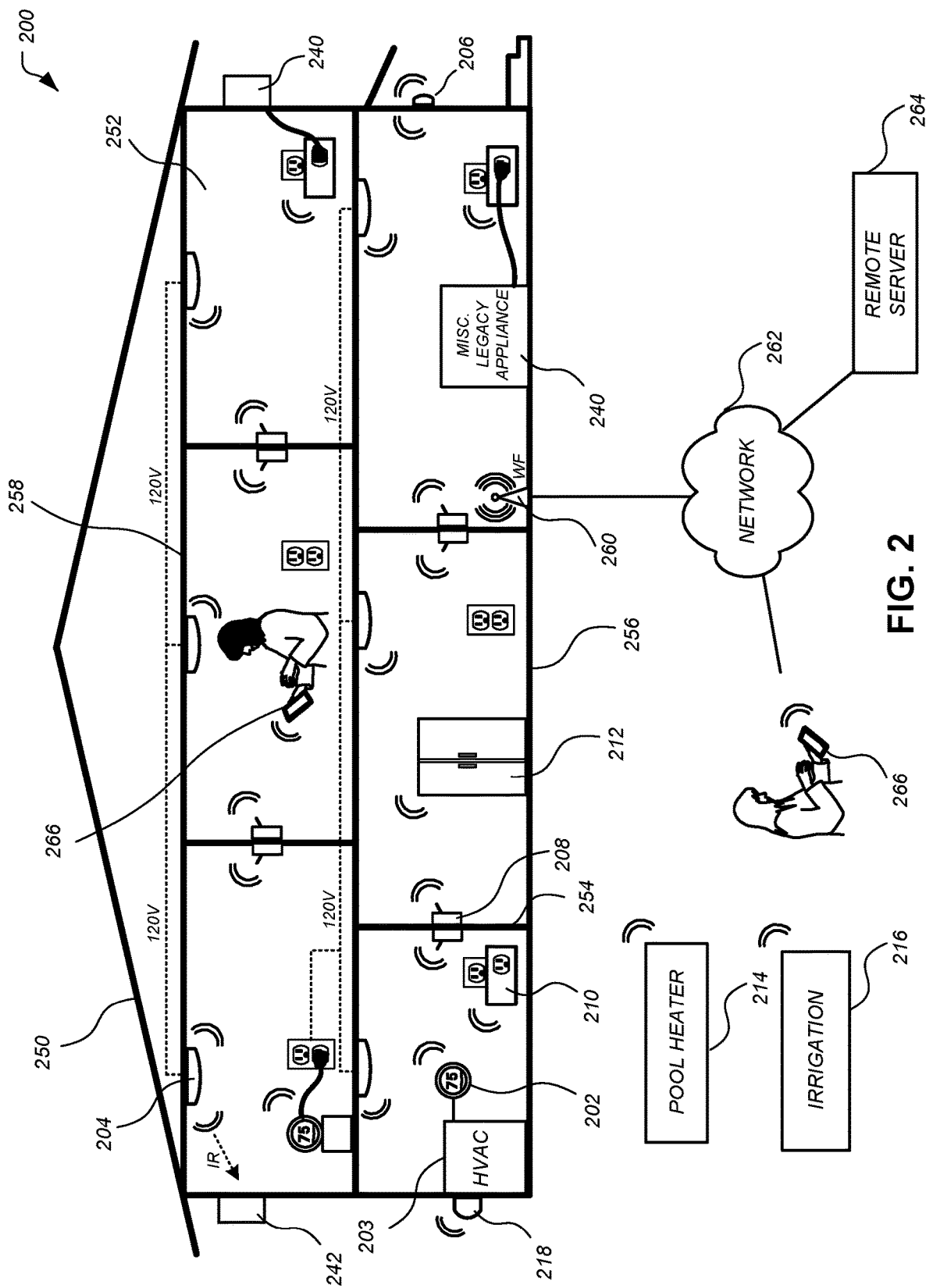
FIG. 2 illustrates an example of a smart home environment within which a portion of the system for implementing demand-response programs and event management may be implemented according to an embodiment.

FIG. 2 illustrates an example of a smart home environment 200 within which one or more of the devices, methods, systems, services, and/or computer program products described further herein can be applicable. The depicted smart home environment includes a structure 250, which can include, e.g., a house, office building, garage, or mobile home. In some embodiments, the structure 250 may correspond to one of structures 150A-150N described with reference to FIG. 1. In addition to the structure 250, the smart home environment 200 also includes a network 262 and remote server 264 which, in one embodiment, respectively correspond to network 140 and energy management system 130 (FIG. 1). While the structure 250 as depicted includes a variety of components and devices as further described herein, a number of components and devices, such as pool heater 214, irrigation system 216, and access device 266 may also be associated with (e.g., powered at) the structure 250 without being physically attached or disposed within or on the structure 250.

The smart home environment 200 includes a plurality of rooms 252 separated at least partly from each other via walls 254. The walls 254 can include interior walls or exterior walls. Each room can further include a floor 256 and a ceiling 258. Devices can be mounted on, integrated with and/or supported by a wall 254, floor 256 or ceiling 258. The various devices that may be incorporated within the smart home environment 200 include intelligent, multi-sensing, network-connected devices that can integrate seamlessly with each other and/or with cloud-based server systems to provide any of a variety of useful smart home objectives. An intelligent, multi-sensing, network-connected thermostat 202 can detect ambient climate characteristics (e.g., temperature and/or humidity) and control a heating, ventilation and air-conditioning (HVAC) system 203. It should be recognized that while control of an HVAC system is described herein, similar principles can equally be applied to controlling other temperature/humidity control systems, such as a heating system, an air conditioning system, a humidity control system, or any combination thereof. One or more intelligent, network-connected, multi-sensing hazard detection units 204 can detect the presence of a hazardous substance and/or a hazardous condition in the home environment (e.g., smoke, fire, or carbon monoxide). One or more intelligent, multi-sensing, network-connected entryway interface devices 206, which can be termed a "smart doorbell", can detect a person's approach to or departure from a location, control audible functionality, announce a person's approach or departure via audio or visual means, or control settings on a security system (e.g., to activate or deactivate the security system).

In some embodiments, the smart home may include at least one energy consumption meter 218 such as a smart meter. The energy consumption meter 218 monitors some or all energy (electricity, gas, etc.) consumed by the devices in and around the structure 250. The energy consumption meter 218 may display the amount of energy consumed over a given period of time on a surface of the meter 218. The given period may be, e.g., a second, a minute, an hour, a day, a month, a time span less than one second, a time span greater than a month, or a time span between one second and one month. In some embodiments, the energy consumption meter 218 may include communication capabilities (wired or wireless) that enable the meter 218 to communicate various information, e.g., the amount of energy consumed over one or more given periods, the price of energy at any particular time or during any particular period of time, etc. The communication capabilities may also enable the meter to receive various information. For example, the meter may receive instructions for controlling one or more devices in the smart home such as the HVAC system 203, the price of energy at any particular time or during any particular period of time, etc. To facilitate control of devices in and around the structure 250, the meter 218 may be wired or wirelessly connected to such devices.

Each of a plurality of intelligent, multi-sensing, network-connected wall light switches 208 can detect ambient lighting conditions, detect room-occupancy states and control a power and/or dim state of one or more lights. In some instances, light switches 208 can further or alternatively control a power state or speed of a fan, such as a ceiling fan. Each of a plurality of intelligent, multi-sensing, network-connected wall plug interfaces 210 can detect occupancy of a room or enclosure and control supply of power to one or more wall plugs (e.g., such that power is not supplied to the plug if nobody is at home). The smart home may further include a plurality of intelligent, multi-sensing, network-connected appliances 212, such as refrigerators, stoves and/or ovens, televisions, washers, dryers, lights (inside and/or outside the structure 250), stereos, intercom systems, garage-door openers, floor fans, ceiling fans, whole-house fans, wall air conditioners, pool heaters 214, irrigation systems 216, security systems, and so forth. While descriptions of FIG. 2 can identify specific sensors and functionalities associated with specific devices, it will be appreciated that any of a variety of sensors and functionalities (such as those described throughout the specification) can be integrated into the device.

In addition to containing processing and sensing capabilities, each of the devices within the smart home environment 200 can be capable of data communications and information sharing with any other devices within the smart home environment 200, as well as to any devices outside the smart home environment 240 such as the access device 266 and/or remote server 264. The devices can send and receive communications via any of a variety of custom or standard wireless protocols (Wi-Fi, ZigBee, 6LoWPAN, IR, IEEE 802.11, IEEE 802.15.4, etc.) and/or any of a variety of custom or standard wired protocols (CAT6 Ethernet, HomePlug, etc.). The wall plug interfaces 210 can serve as wireless or wired repeaters, and/or can function as bridges between (i) devices plugged into AC outlets and communicating using Homeplug or other power line protocol, and (ii) devices that are not plugged into AC outlets.

For example, a first device can communicate with a second device via a wireless router 260. A device can further communicate with remote devices via a connection to a network, such as the network 262. Through the network 262, the device can communicate with a central (i.e., remote) server or a cloud-computing system 264. The remote server or cloud-computing system 264 can be associated with a manufacturer, support entity or service provider associated with the device. In one embodiment, a user may be able to contact customer support using a device itself rather than needing to use other communication means such as a telephone or Internet-connected computer.

Devices' network connections can further allow a user to interact with the device even if the user is not proximate to the device. For example, a user can communicate with a device (e.g., thermostat 202) using a computer (e.g., a desktop computer, laptop computer, or tablet) or other portable electronic device (e.g., a smartphone) 266. A webpage or software application can be configured to receive communications from the user and control the device based on the communications and/or to present information about the device's operation to the user. For example, when the portable electronic device 266 is being used to interact with the thermostat 202, the user can view a current setpoint temperature for a thermostat and adjust it using the portable electronic device 266. The user can be in the structure during this remote communication or outside the structure. The communications between the portable electronic device 266 and the thermostat 202 may be routed via the remote server 264 (e.g., when the portable electronic device 266 is remote from structure 250) or, in some embodiments, may be routed exclusive of the remote server 264.

The smart home environment 200 also can include a variety of non-communicating legacy appliances 240, such as old conventional washer/dryers, refrigerators, and the like which can be controlled, albeit coarsely (ON/OFF), by virtue of the wall plug interfaces 210. The smart home can further include a variety of partially communicating legacy appliances 242, such as IR-controlled wall air conditioners or other IR-controlled devices, which can be controlled by IR signals provided by the hazard detection units 204 or the light switches 208 or, in some embodiments, by using socket-based communication protocol such as powerline to communicate via a wall plug interface 210.

It should be recognized that some or all of the components located inside and outside of structure 250 may be considered part of energy management system 130 depending on the embodiment. In general, devices or components which facilitate control of other energy consumption devices may be considered to be part of energy management system 130. For example, thermostat 202 and access device 266 may be part of energy management system 130 while energy consuming components such as HVAC 203, pool heater 214, and legacy appliances 240 may be considered external to energy management system 130 as they comprise energy consuming elements that are controllable by the thermostat 202 and access device 266. In other examples, however, additional or alternative components of smart home environment 200 may be considered part of energy management system 130, such as hazard detection units 204, entryway interface devices 206, light switches 208, plug interface 210, etc., as they may provide monitoring (and/or control) functionality for the energy management system 130 to assist the system 130 in making intelligent energy management decisions. In yet other examples, none of the devices of the smart home environment (except for remote server 264) may be part of energy management system 130, but rather one or more of the devices of the smart home environment 200 may be submissive devices that are remotely controlled by energy management system 130 to perform monitoring and/or energy consumption tasks.

Smart home 200 in certain embodiments is an environment including a number of client devices and access devices all operable to communicate with one another as well as with devices or systems external to the smart home 200 such as remote server 264. However, it will be appreciated by those skilled in the art that such an environment could operate equally well having fewer or a greater number of components than are illustrated in FIG. 2. One particular example of a smart-home environment including various elements having differing functionality is described in detail in U.S. Provisional Ser. No. 61/704,437, filed Sep. 21, 2012, the entire contents of which are incorporated by reference herein in their entirety for all purposes. Thus, the depiction of the smart home environment 200 in FIG. 2 should be taken as being illustrative in nature, and not limiting to the scope of the present teachings.

Figure 3A:
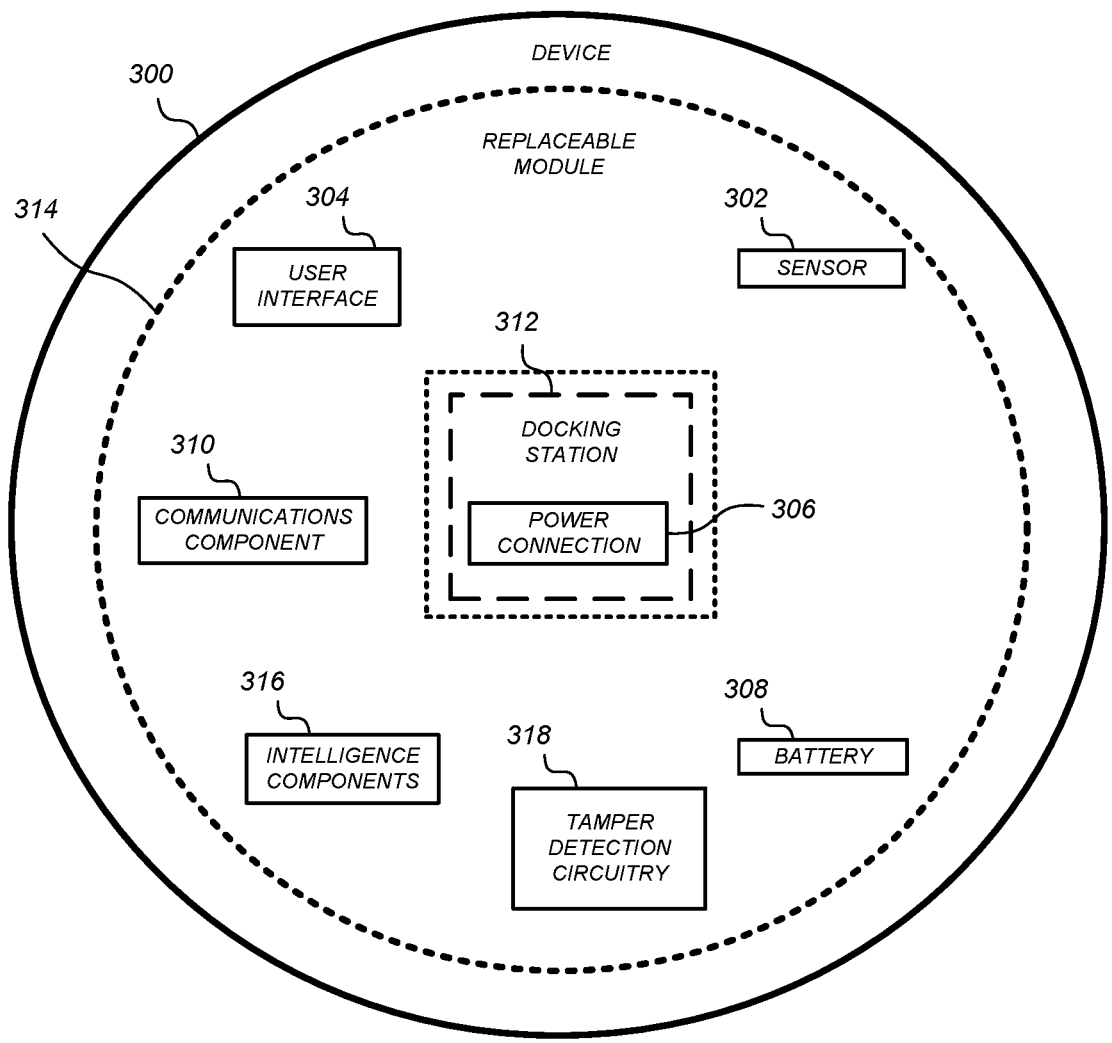
FIG. 3A illustrates an example of general device components which can be included in an intelligent, network-connected device according to an embodiment.

FIG. 3A illustrates an example of general device components which can be included in an intelligent, network-connected device 300 (i.e., "device"). Device 300 may be implemented as one or more of the various devices discussed with reference to FIG. 2, such as thermostat 202, hazard detection unit 204, entryway interface device 206, wall light switch 208, wall plug interface 210, etc. Much of the following discussion presents the device 300 as being a thermostat 202, but it should be recognized that embodiments are not so limited. Each of one, more or all devices 300 within a system of devices can include one or more sensors 302, a user-interface component 304, a power supply (e.g., including a power connection 306 and/or battery 308), a communications component 310, a modularity unit (e.g., including a docking station 312 and replaceable module 314), intelligence components 316, and tamper detection circuitry 318. Particular sensors 302, user-interface components 304, power-supply configurations, communications components 310, modularity units, intelligence components 316, and/or wire tamper detection circuitry 318 can be the same or similar across devices 300 or can vary depending on device type or model.

By way of example and not by way of limitation, one or more sensors 302 in a device 300 may be able to, e.g., detect acceleration, temperature, humidity, water, supplied power, proximity, external motion, device motion, sound signals, ultrasound signals, light signals, fire, smoke, carbon monoxide, global-positioning-satellite (GPS) signals, or radio-frequency (RF) or other electromagnetic signals or fields. Thus, for example, sensors 302 can include temperature sensor(s), humidity sensor(s), hazard-related sensor(s) or other environmental sensor(s), accelerometer(s), microphone(s), optical sensor(s) up to and including camera(s) (e.g., charged-coupled-device or video cameras), active or passive radiation sensor(s), GPS receiver(s) or radio-frequency identification detector(s). While FIG. 3A illustrates an embodiment with a single sensor, many embodiments will include multiple sensors. In some instances, device 300 includes one or more primary sensors and one or more secondary sensors. The primary sensor(s) can sense data central to the core operation of the device (e.g., sensing a temperature in a thermostat or sensing smoke in a smoke detector). The secondary sensor(s) can sense other types of data (e.g., motion, light or sound), which can be used for energy-efficiency objectives or smart-operation objectives. In some instances, an average user may even be unaware of an existence of a secondary sensor.

One or more user-interface components 304 in device 300 may be configured to present information to a user via a visual display (e.g., a thin-film-transistor display or organic light-emitting-diode display) and/or an audio speaker and/or some other communication medium. User-interface component 304 can also include one or more user-input components to receive information from a user, such as a touchscreen, buttons, scroll component (e.g., a movable or virtual ring component), microphone or camera (e.g., to detect gestures). In one embodiment, user-interface component 304 includes a click-and-rotate annular ring component, wherein a user can interact with the component by rotating the ring (e.g., to adjust a setting) and/or by clicking the ring inwards (e.g., to select an adjusted setting or to select an option). In another embodiment, user-input component 304 includes a camera, such that gestures can be detected (e.g., to indicate that a power or alarm state of a device is to be changed).

A power-supply component in device 300 may include a power connection 306 and/or local battery 308. For example, power connection 306 can connect device 300 to a power source such as a line voltage source. In some instances, connection 306 to an AC power source can be used to repeatedly charge a (e.g., rechargeable) local battery 308, such that battery 308 can later be used to supply power if needed in the event of an AC power disconnection or other power deficiency scenario.

A communications component 310 in device 300 can include a component that enables device 300 to communicate with a central server, such as remote server 264, or a remote device, such as another device 300 described herein or a portable user device. Communications component 310 can allow device 300 to communicate using one or more wired or wireless communication techniques, either simultaneously or sequentially, such as Wi-Fi, ZigBee, 3G/4G wireless, IEEE 802.11, IEEE 802.15.4, 6-LO-PAN, Bluetooth, CAT6 wired Ethernet, HomePlug or other powerline communications method, telephone, or optical fiber, by way of non-limiting examples. Communications component 310 can include one or more wireless cards, Ethernet plugs, or other transceiver connections. In some embodiments, the communications component 310 facilitates communication with a central server to synchronize information between device 300, the central server, and in some cases additional devices. Techniques for synchronizing data between such devices are further described in the commonly assigned U.S. Ser. No. 13/624,892 (Ref. No. NES0231-US), filed Sep. 22, 2012, the contents of which are incorporated by reference herein in their entirety for all purposes.

A modularity unit in device 300 can include a static physical connection, and a replaceable module 314. Thus, the modularity unit can provide the capability to upgrade replaceable module 314 without completely reinstalling device 300 (e.g., to preserve wiring). The static physical connection can include a docking station 312 (which may also be termed an interface box) that can attach to a building structure. For example, docking station 312 could be mounted to a wall via screws or stuck onto a ceiling via adhesive. Docking station 312 can, in some instances, extend through part of the building structure. For example, docking station 312 can connect to wiring (e.g., to 120V line voltage wires) behind the wall via a hole made through a wall's sheetrock. Docking station 312 can include circuitry such as power-connection circuitry 306 and/or AC-to-DC powering circuitry and can prevent the user from being exposed to high-voltage wires. Docking station 312 may also or alternatively include control circuitry for actuating (i.e., turning on and off) elements of an HVAC system, such as a heating unit (for heating the building structure), an air-condition unit (for cooling the building structure), and/or a ventilation unit (for circulating air throughout the building structure). In some instances, docking stations 312 are specific to a type or model of device, such that, e.g., a thermostat device includes a different docking station than a smoke detector device. In some instances, docking stations 312 can be shared across multiple types and/or models of devices 300.

Replaceable module 314 of the modularity unit can include some or all sensors 302, processors, user-interface components 304, batteries 308, communications components 310, intelligence components 316 and so forth of the device. Replaceable module 314 can be configured to attach to (e.g., plug into or connect to) docking station 312. In some instances, a set of replaceable modules 314 are produced with the capabilities, hardware and/or software, varying across the replaceable modules 314. Users can therefore easily upgrade or replace their replaceable module 314 without having to replace all device components or to completely reinstall device 300. For example, a user can begin with an inexpensive device including a first replaceable module with limited intelligence and software capabilities. The user can then easily upgrade the device to include a more capable replaceable module. As another example, if a user has a Model #1 device in their basement, a Model #2 device in their living room, and upgrades their living-room device to include a Model #3 replaceable module, the user can move the Model #2 replaceable module into the basement to connect to the existing docking station. The Model #2 replaceable module may then, e.g., begin an initiation process in order to identify its new location (e.g., by requesting information from a user via a user interface).

Intelligence components 316 of the device can support one or more of a variety of different device functionalities. Intelligence components 316 generally include one or more processors configured and programmed to carry out and/or cause to be carried out one or more of the advantageous functionalities described herein. The intelligence components 316 can be implemented in the form of general-purpose processors carrying out computer code stored in local memory (e.g., flash memory, hard drive, random access memory), special-purpose processors or application-specific integrated circuits, combinations thereof, and/or using other types of hardware/firmware/software processing platforms. The intelligence components 316 can furthermore be implemented as localized versions or counterparts of algorithms carried out or governed remotely by central servers or cloud-based systems, such as by virtue of running a Java virtual machine (JVM) that executes instructions provided from a cloud server using Asynchronous Javascript and XML (AJAX) or similar protocols. By way of example, intelligence components 316 can be configured to detect when a location (e.g., a house or room) is occupied, up to and including whether it is occupied by a specific person or is occupied by a specific number and/or set of people (e.g., relative to one or more thresholds). Such detection can occur, e.g., by analyzing microphone signals, detecting user movements (e.g., in front of a device), detecting openings and closings of doors or garage doors, detecting wireless signals, detecting an IP address of a received signal, or detecting operation of one or more devices within a time window. Intelligence components 316 may include image-recognition technology to identify particular occupants or objects.

In some instances, intelligence components 316 can be configured to predict desirable settings and/or to implement those settings. For example, based on the presence detection, intelligence components 316 can adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), intelligence components 316 can initiate an audio or visual indicator of where the person, animal or object is or can initiate an alarm or security feature if an unrecognized person is detected under certain conditions (e.g., at night or when lights are out). As yet another example, intelligence components 316 can detect hourly, weekly or even seasonal trends in user settings and adjust settings accordingly. For example, intelligence components 316 can detect that a particular device is turned on every week day at 6:30 am, or that a device setting is gradually adjusted from a high setting to lower settings over the last three hours. Intelligence components 316 can then predict that the device is to be turned on every week day at 6:30 am or that the setting should continue to gradually lower its setting over a longer time period.

In some instances, devices can interact with each other such that events detected by a first device influence actions of a second device. For example, a first device can detect that a user has pulled into a garage (e.g., by detecting motion in the garage, detecting a change in light in the garage or detecting opening of the garage door). The first device can transmit this information to a second device, such that the second device can, e.g., adjust a home temperature setting, a light setting, a music setting, and/or a security-alarm setting. As another example, a first device can detect a user approaching a front door (e.g., by detecting motion or sudden light-pattern changes). The first device can, e.g., cause a general audio or visual signal to be presented (e.g., such as sounding of a doorbell) or cause a location-specific audio or visual signal to be presented (e.g., to announce the visitor's presence within a room that a user is occupying).

Tamper detection circuitry 318 may be part or separate from intelligence components 316. Tamper detection circuitry 318 may include software and/or hardware operable to detect tampering of the device 300. Tampering may include, e.g., a disconnect between the device 300 and the HVAC indicative of a user attempt to obviate HVAC control by the remote server during a DR event, a change in impedance or power consumption by the HVAC indicative of a user attempt to obviate HVAC control by the remote server during a DR event, etc.

Figure 3B:
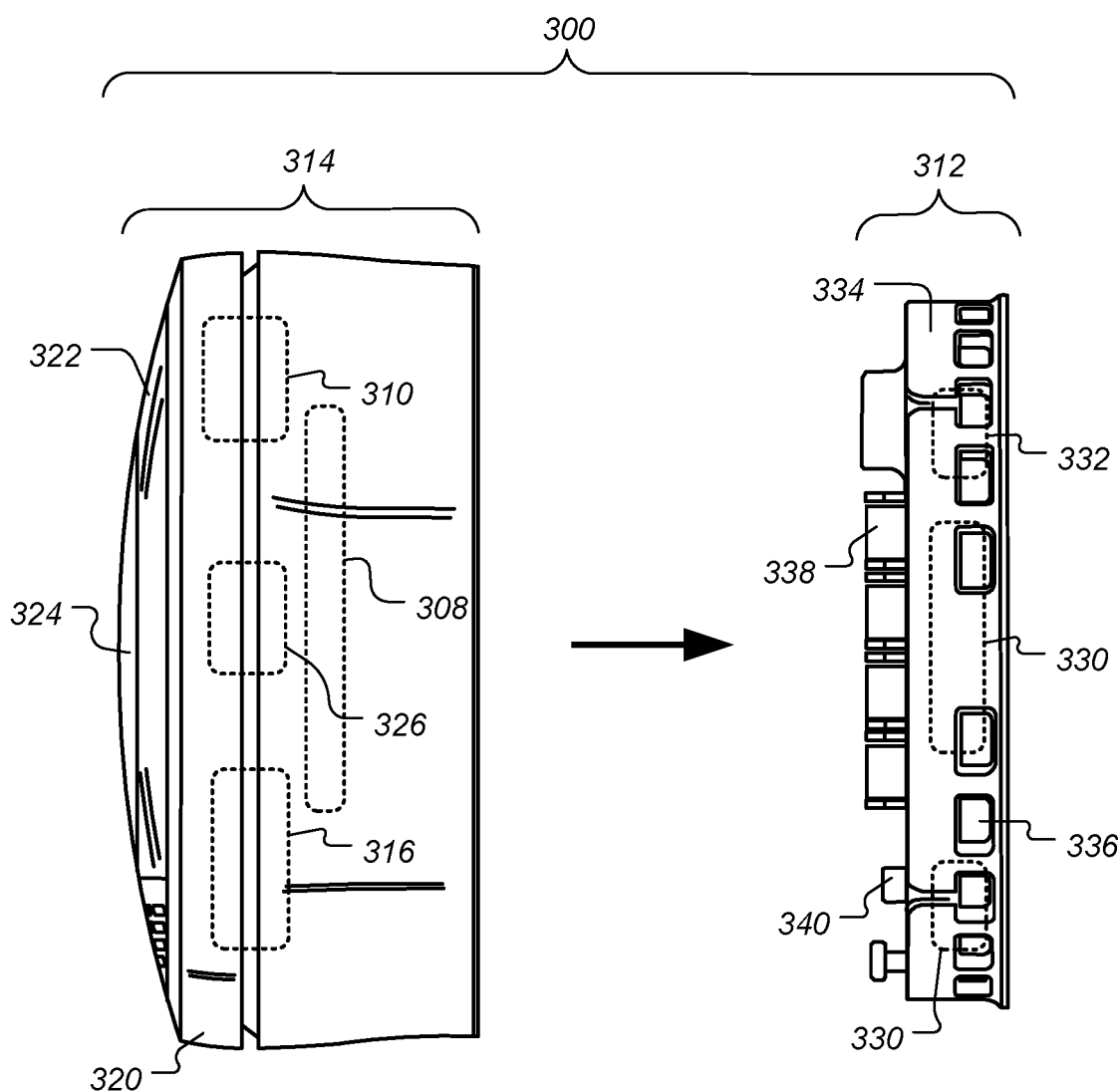
FIG. 3B illustrates an intelligent, network-connected device having a replaceable module and a docking station according to an embodiment.

FIG. 3B illustrates an intelligent, network-connected device 300 having a replaceable module 314 (e.g., a head unit) and a docking station 312 (e.g., a back plate) for ease of installation, configuration, and upgrading according to some embodiments. As described hereinabove, device 300 may be wall mounted, have a circular shape, and have an outer rotatable ring 320 (that may be, e.g., part of user interface 304) for receiving user input. Outer rotatable ring 320 allows the user to make adjustments, such as selecting a new target temperature. For example, by rotating outer ring 320 clockwise, a target setpoint temperature can be increased, and by rotating the outer ring 320 counterclockwise, the target setpoint temperature can be decreased. Changes to an existing setpoint temperature that reflect a desire for the temperature in the structure to be immediately changed to that setpoint temperature may herein be referred to as changes to an "immediate setpoint temperature" or a "current setpoint temperature". This is in contrast to setpoint temperatures that may be provided in a hourly, daily, weekly, monthly, or other schedule in which setpoint temperatures may reflect a desire for future temperatures in the structure. Such setpoint temperatures may herein be referred as "scheduled setpoint temperature" or as a "schedule of setpoint temperatures".

Device 300 has a cover 322 that includes a display 324 (that may be, e.g., part of user interface 304). Head unit 314 slides onto back plate 312. Display 324 may display a variety of information depending on, e.g., a current operational state of the device 300, direct user interaction with the device via ring 320, sensed presence of the user via, e.g., a proximity sensor 302 (such as a passive infrared motion sensor), remote user interaction with the device via a remote access device, etc. For example, display 324 may display central numerals that are representative of a current setpoint temperature.

According to some embodiments the connection of the head unit 314 to back plate 312 can be accomplished using magnets, bayonet, latches and catches, tabs or ribs with matching indentations, or simply friction on mating portions of the head unit 314 and back plate 312. According to some embodiments, the head unit 314 includes battery 308, communications component 310, intelligence components 316, and a display driver 326 (that may be, e.g., part of user interface 304). Battery 308 may be recharged using recharging circuitry (that may be, e.g., part of intelligence components 316 and/or may be included in the back plate 312) that uses power from the back plate 312 that is either obtained via power harvesting (also referred to as power stealing and/or power sharing) from the HVAC system control circuit(s) or from a common wire, if available, as described in further detail in commonly assigned co-pending U.S. Ser. No. 13/034,674 (Ref. No. NES0006-US) and U.S. Ser. No. 13/034,678 (Ref. No. NES0007-US), both filed Feb. 24, 2011, and commonly assigned U.S. Ser. No. 13/267,871 (Ref. No. NES0158-US), filed Oct. 6, 2011, all of which are incorporated by reference herein in their entirety for all purposes. According to some embodiments, battery 308 is a rechargeable single cell lithium-ion, or a lithium-polymer battery.

Back plate 312 includes electronics 330 and a temperature sensor 332 (that may be, e.g., one of sensors 302) in housing 334, which are ventilated via vents 336. Temperature sensor 332 allows the back plate 312 to operate as a fully functional thermostat even when not connected to the head unit 314. Wire connectors 338 are provided to allow for connection to HVAC system wires, such as connection to wires for actuating components of the HVAC system, wires for receiving power from the HVAC system, etc. Connection terminal 340 is a male or female plug connector that provides electrical connections between the head unit 314 and back plate 312. Various arrangements for connecting to and controlling an HVAC system are further described in U.S. Ser. Nos. 13/034,674 and 13/034,678, supra.

In some embodiments, the back plate electronics 330 includes an MCU processor, and driver circuitry for opening and closing the HVAC control circuits, thereby turning on and turning off the one or more HVAC functions such as heating and cooling. The electronics 330 also includes flash memory which is used to store a series of programmed settings that take effect at different times of the day, such that programmed setpoint (i.e., desired temperature) changes can be carried out even when the head unit 314 is not attached to the back plate 312. According to some embodiments, the electronics 330 also includes power harvesting circuitry (that may be in addition or alternatively to that provided in head unit 314) to obtain power from the HVAC control circuit(s) even when an HVAC common power wire is not available. In various embodiments, tamper detection circuitry 318 (FIG. 3A) may also be incorporated in one or more of the head unit 314 and back plate 312 such that tampering may be detected regardless of whether the head unit 314 is coupled to the back plate 312.

Figure 3C:
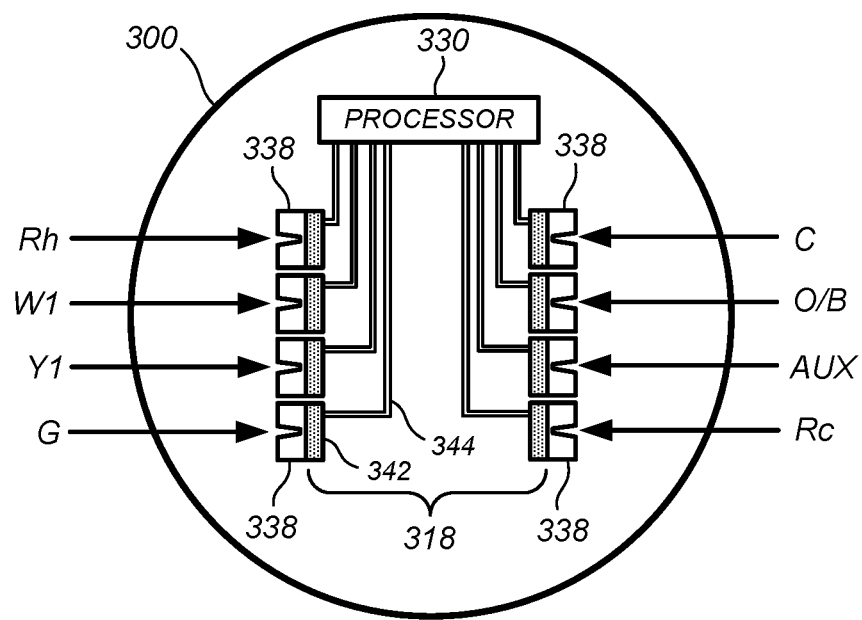
FIG. 3C illustrates connection ports and wire insertion sensing circuitry of an intelligent, network-connected device according to an embodiment.

FIG. 3C illustrates a conceptual diagram of the device 300 with particular reference to the wire connectors 338 and tamper detection circuitry 318. It is to be appreciated that the wire connectors 338 and tamper detection circuitry 318 can, in whole or in part, be separably or inseparably integral with the main body of the device 300 without departing from the scope of the present teachings. Thus, for example, for one embodiment the wire connectors 338 and tamper detection circuitry 318 can be inseparably integral with the main body of the device 300, with the HVAC wires being inserted directly into the back before placement on the wall as a single monolithic unit. In another embodiment, the wire connectors 338 and tamper detection circuitry 318 can be located in a wall plate unit to which the main body of the thermostat attaches, it being understood that references herein to the insertion of wires into the thermostat encompass embodiments in which the wires are inserted into the wall plate and the main body is attached to the wall plate to form the completed device 300.

As illustrated in FIG. 3C, each wire connector 338 is associated with a predetermined HVAC signal type. For one embodiment that has been found to provide an optimal balance between simplicity of installation for do-it-yourselfers and a reasonably broad retrofit applicability for a large number of homes, there are eight (8) wire connectors 338 provided, which are dedicated respectively to a selected group of HVAC signal types consisting of heating call power (Rh), heating call (W1), cooling call (Y1), fan call (G), common (C), heat pump (O/B), auxiliary (AUX), and heating call power (Rh). Preferably, the device 300 is of a "jumperless" type according to the commonly assigned U.S. Ser. No. 13/034,674, supra, such that (i) the Rh and Rc connection ports automatically remain shunted together for cases in which there is a single call power wire provided by the HVAC system, one or the other connection port receiving a single call power wire (which might be labeled R, V, Rh, or Rc depending on the particular HVAC installation), and (ii) the Rh and Rc connection ports are automatically electrically segregated for cases in which there are dual call power wires provided by the HVAC system that are inserted.

According to one embodiment, tamper detection circuitry 318 includes, for each wire connector 338, a port sensing circuit 342 that communicates with the back plate electronics 330 over a pair of electrical leads 344. Although the port sensing circuit 342 can operate in a variety of different ways without departing from the scope of the present teachings, in one embodiment the control port sensing circuit 342 comprises a two-position switch (not shown) coupled to the electrical leads 344, the two-position switch being closed to short the electrical leads 344 together when no wire has been inserted into the associated wire connector 338, the two-position switch being mechanically urged into an open position to electrically segregate the electrical leads 344 when a wire is inserted into the associated wire connector 338. The back plate electronics 330 thereby is able to readily sense when a wire is inserted into the connection port by virtue of the shorted or open state of the electrical leads 344. One particularly advantageous configuration that implements the combined functionality of the wire connector 338 and the port sensing circuit 342 is described in the commonly assigned U.S. Ser. No. 13/034,666 (Ref. No. NES0035-US), filed Feb. 24, 2011, the contents of which are incorporated by reference in their entirety for all purposes.

Device 300 in certain embodiments is an intelligent, network-connected learning thermostat that includes various components such as a head unit, a back plate, a user interface, communications components, intelligent components, etc. However, it will be appreciated by those skilled in the art that devices that perform the various operations described herein could operate equally well with fewer or a greater number of components than are illustrated in FIGS. 3A through 3C. For example, the device 300 may be formed as a single unit rather than multiple modules, and may include more or fewer components than described with reference to FIGS. 3A to 3C. For example, the device 300 may be formed as described in U.S. Ser. No. 13/624,878, filed Sep. 21, 2012, and/or as described in U.S. Ser. No. 13/632,148, filed Sep. 30, 2012, both of which are incorporated herein by reference in their entirety for all purposes. Thus, the depiction of device 300 in FIGS. 3A through 3C should be taken as being illustrative in nature, and not limiting to the scope of the present teachings.

Figure 4:
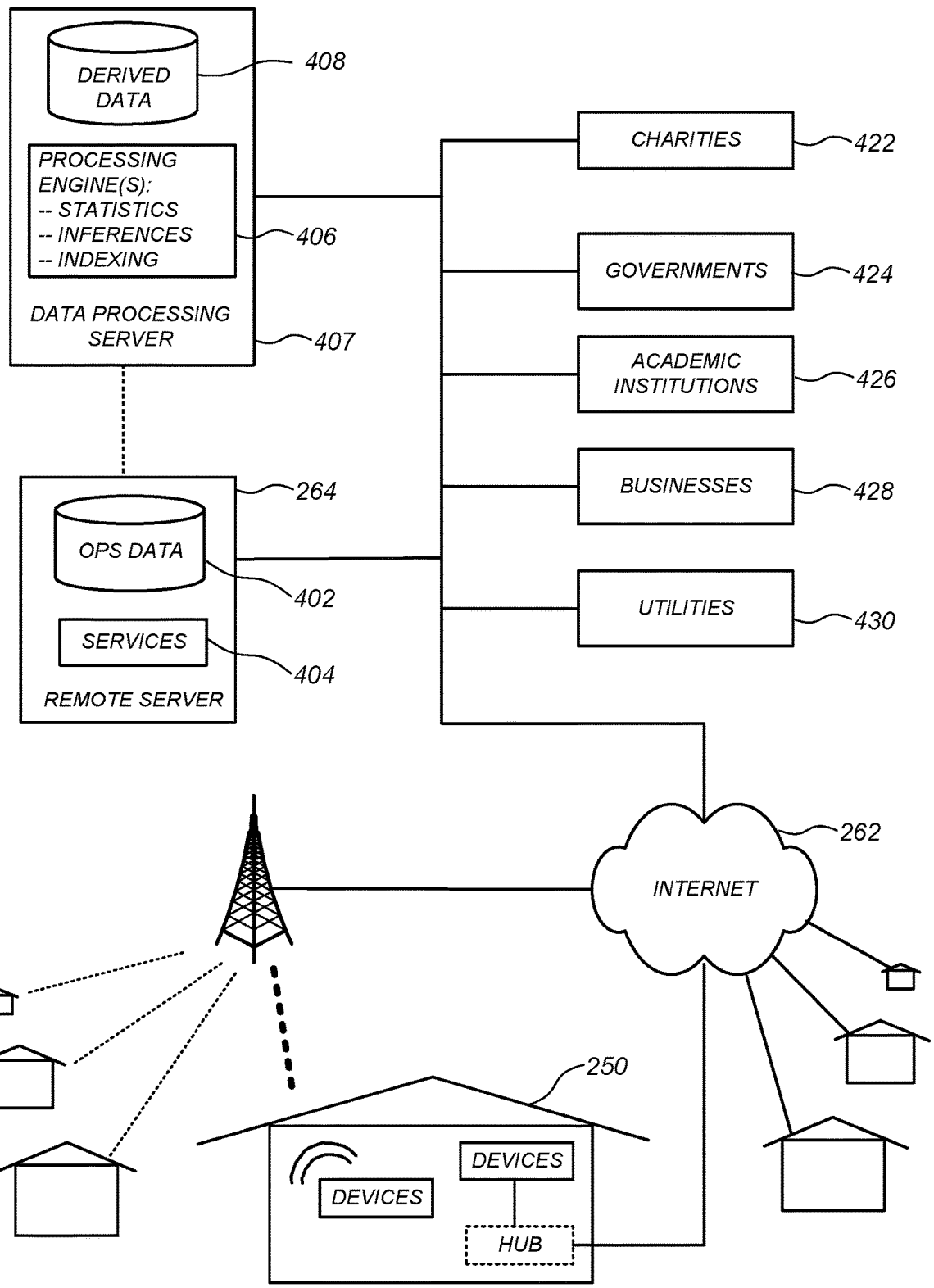
FIG. 4 illustrates a network-level view of an extensible devices and services platform with which a smart home environment and systems for implementing demand-response programs and event management can be integrated according to an embodiment.

FIG. 4 illustrates a network-level view of an extensible devices and services platform with which the smart home of FIGS. 1 and/or 2 and/or the device of FIGS. 3A through 3C can be integrated. Each of the intelligent, network-connected devices discussed previously with reference to structure 250 can communicate with one or more remote servers or cloud computing systems 264. The communication can be enabled by establishing connection to the network 262 either directly (for example, using 3G/4G connectivity to a wireless carrier), through a hubbed network (which can be a scheme ranging from a simple wireless router, for example, up to and including an intelligent, dedicated whole-home control node), or through any combination thereof.

The remote server or cloud-computing system 264 can collect operation data 402 from the smart home devices. For example, the devices can routinely transmit operation data or can transmit operation data in specific instances (e.g., when requesting customer support). The remote server or cloud-computing architecture 264 can further provide one or more services 404. The services 404 can include, e.g., software updates, customer support, sensor data collection/logging, remote access, remote or distributed control, or use suggestions (e.g., based on collected operation data 402 to improve performance, reduce utility cost, etc.). Data associated with the services 404 can be stored at the remote server or cloud-computing system 264 and the remote server or cloud-computing system 264 can retrieve and transmit the data at an appropriate time (e.g., at regular intervals, upon receiving request from a user, etc.).

One salient feature of the described extensible devices and services platform, as illustrated in FIG. 4, is a processing engine 406, which can be concentrated at a single data processing server 407 (which may be included in or separate from remote server 264) or distributed among several different computing entities without limitation. Processing engine 406 can include engines configured to receive data from a set of devices (e.g., via the Internet or a hubbed network), to index the data, to analyze the data and/or to generate statistics based on the analysis or as part of the analysis. The analyzed data can be stored as derived data 408. Results of the analysis or statistics can thereafter be transmitted back to a device providing ops data used to derive the results, to other devices, to a server providing a webpage to a user of the device, or to other non-device entities. For example, use statistics, use statistics relative to use of other devices, use patterns, and/or statistics summarizing sensor readings can be transmitted. The results or statistics can be provided via the network 262. In this manner, processing engine 406 can be configured and programmed to derive a variety of useful information from the operational data obtained from the smart home. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, the processing engine 406 can generate statistics about device usage across a population of devices and send the statistics to device users, service providers or other entities (e.g., that have requested or may have provided monetary compensation for the statistics). As specific illustrations, statistics can be transmitted to charities 422, governmental entities 424 (e.g., the Food and Drug Administration or the Environmental Protection Agency), academic institutions 426 (e.g., university researchers), businesses 428 (e.g., providing device warranties or service to related equipment), or utility companies 430. These entities can use the data to form programs to reduce energy usage, to preemptively service faulty equipment, to prepare for high service demands, to track past service performance, etc., or to perform any of a variety of beneficial functions or tasks now known or hereinafter developed.

Figure 5:
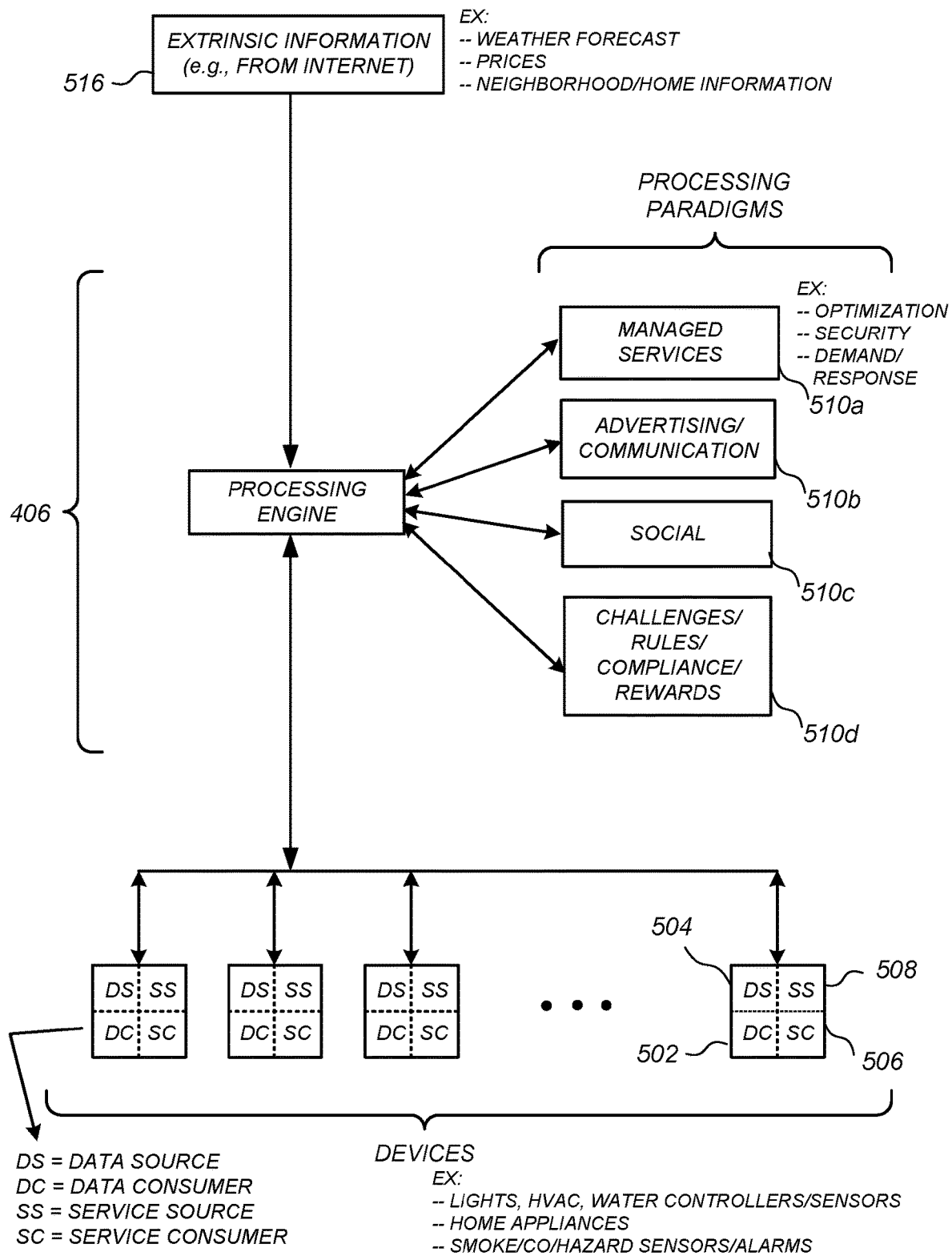
FIG. 5 illustrates an abstracted functional view of the extensible devices and services platform of FIG. 4.

FIG. 5 illustrates an abstracted functional view of the extensible devices and services platform of FIG. 4, with particular reference to the processing engine 406 as well as the devices of the smart home environment, according to an embodiment. Even though the devices situated in the smart home environment have an endless variety of different individual capabilities and limitations, they can all be thought of as sharing common characteristics in that each of them is a data consumer 502 (DC), a data source 504 (DS), a services consumer 506 (SC), and/or a services source 508 (SS). Advantageously, in addition to providing the essential control information needed for the devices to achieve their local and immediate objectives, the extensible devices and services platform can also be configured to harness the large amount of data that is flowing out of these devices. In addition to enhancing or optimizing the actual operation of the devices themselves with respect to their immediate functions, the extensible devices and services platform can also be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 5 shows processing engine 406 as including a number of paradigms 510. Processing engine 406 can include a managed services paradigm 510a that monitors and manages primary or secondary device functions. The device functions can include ensuring proper operation of a device given user inputs, estimating that (e.g., and responding to) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 406 can further include an advertising/communication paradigm 510b that estimates characteristics (e.g., demographic information), desires and/or products of interest of a user based on device usage. Services, promotions, products or upgrades can then be offered or automatically provided to the user. Processing engine 406 can further include a social paradigm 510c that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. Processing engine 406 can include a challenges/rules/compliance/rewards paradigm 510d that informs a user of challenges, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc.

Processing engine 406 can integrate or otherwise utilize extrinsic information 516 from extrinsic sources to improve the functioning of one or more processing paradigms. Extrinsic information 516 can be used to interpret operational data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform, ranging from the ordinary to the profound. Thus, in one "ordinary" example, each bedroom of the smart home can be provided with a smoke/fire/CO alarm that includes an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same data bedroom occupancy data that is being used for fire safety can also be "repurposed" by the processing engine 406 in the context of a social paradigm of neighborhood child development and education. Thus, for example, the same bedroom occupancy and motion data discussed in the "ordinary" example can be collected and made available for processing (properly anonymized) in which the sleep patterns of schoolchildren in a particular ZIP code can be identified and tracked. Localized variations in the sleeping patterns of the schoolchildren may be identified and correlated, for example, to different nutrition programs in local schools.

Figure 6:
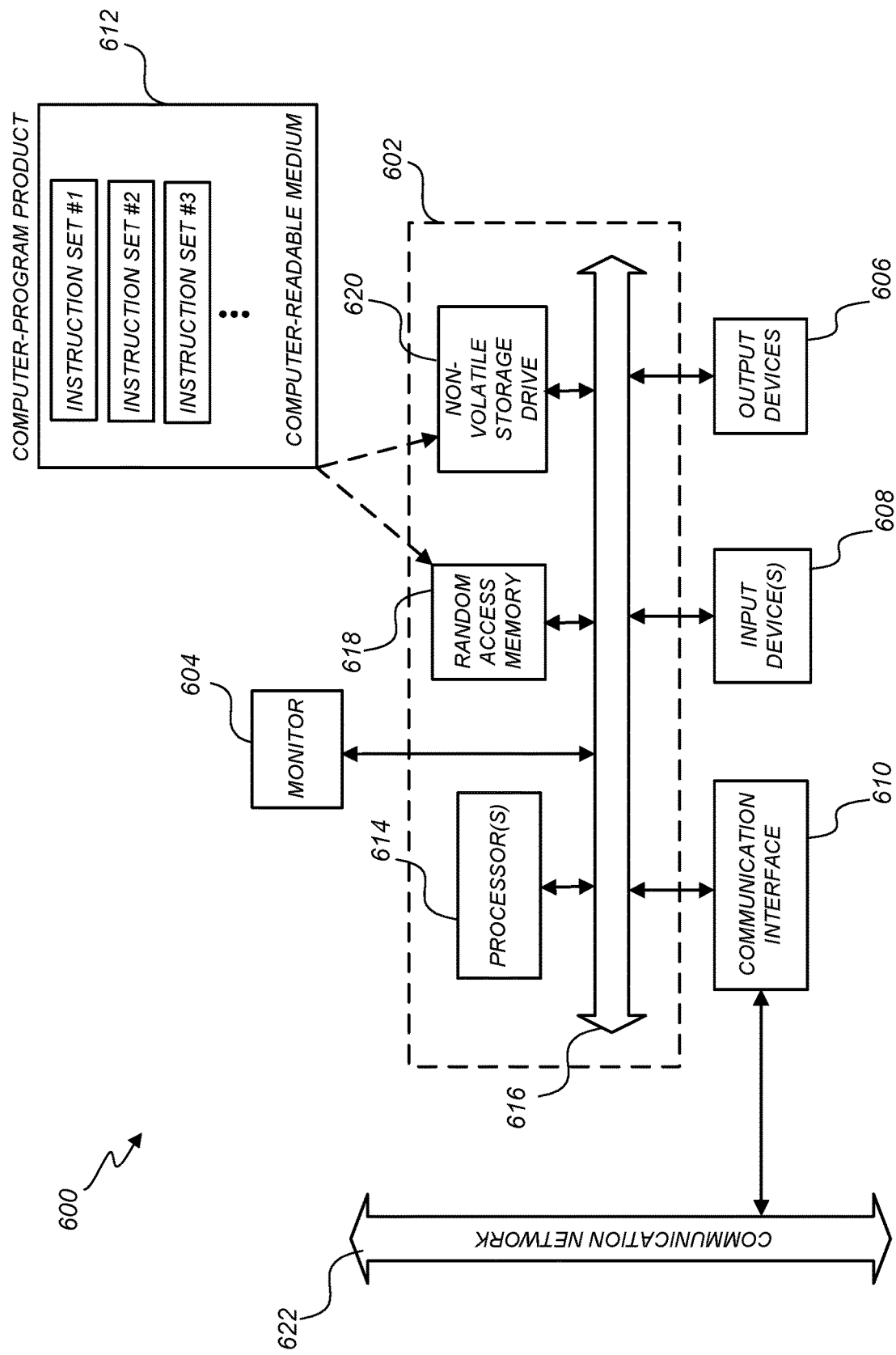
FIG. 6 is a block diagram of a special-purpose computer system according to an embodiment.

FIG. 6 is a block diagram of a special-purpose computer system 600 according to an embodiment. For example, one or more of a utility provider computing system 120, energy management system 130, elements of smart home environment 200, remote server 264, client device 300, processing engine 406, data processing server 407, or other electronic components described herein may be implemented as a special-purpose computer system 600. The methods and processes described herein may similarly be implemented by tangible, non-transitory computer readable storage mediums and/or computer-program products that direct a computer system to perform the actions of the methods and processes described herein. Each such computer-program product may comprise sets of instructions (e.g., codes) embodied on a computer-readable medium that directs the processor of a computer system to perform corresponding operations. The instructions may be configured to run in sequential order, or in parallel (such as under different processing threads), or in a combination thereof.

Special-purpose computer system 600 comprises a computer 602, a monitor 604 coupled to computer 602, one or more additional user output devices 606 (optional) coupled to computer 602, one or more user input devices 608 (e.g., keyboard, mouse, track ball, touch screen) coupled to computer 602, an optional communications interface 610 coupled to computer 602, and a computer-program product including a tangible computer-readable storage medium 612 in or accessible to computer 602. Instructions stored on computer-readable storage medium 612 may direct system 600 to perform the methods and processes described herein. Computer 602 may include one or more processors 614 that communicate with a number of peripheral devices via a bus subsystem 616. These peripheral devices may include user output device(s) 606, user input device(s) 608, communications interface 610, and a storage subsystem, such as random access memory (RAM) 618 and non-volatile storage drive 620 (e.g., disk drive, optical drive, solid state drive), which are forms of tangible computer-readable memory.

Computer-readable medium 612 may be loaded into random access memory 618, stored in non-volatile storage drive 620, or otherwise accessible to one or more components of computer 602. Each processor 614 may comprise a microprocessor, such as a microprocessor from Intel® or Advanced Micro Devices, Inc.®, or the like. To support computer-readable medium 612, the computer 602 runs an operating system that handles the communications between computer-readable medium 612 and the above-noted components, as well as the communications between the above-noted components in support of the computer-readable medium 612. Exemplary operating systems include Windows® or the like from Microsoft Corporation, Solaris® from Sun Microsystems, LINUX, UNIX, and the like. In many embodiments and as described herein, the computer-program product may be an apparatus (e.g., a hard drive including case, read/write head, etc., a computer disc including case, a memory card including connector, case, etc.) that includes a computer-readable medium (e.g., a disk, a memory chip, etc.). In other embodiments, a computer-program product may comprise the instruction sets, or code modules, themselves, and be embodied on a computer-readable medium.

User input devices 608 include all possible types of devices and mechanisms to input information to computer system 602. These may include a keyboard, a keypad, a mouse, a scanner, a digital drawing pad, a touch screen incorporated into the display, audio input devices such as voice recognition systems, microphones, and other types of input devices. In various embodiments, user input devices 608 are typically embodied as a computer mouse, a trackball, a track pad, a joystick, wireless remote, a drawing tablet, a voice command system. User input devices 608 typically allow a user to select objects, icons, text and the like that appear on the monitor 604 via a command such as a click of a button or the like. User output devices 606 include all possible types of devices and mechanisms to output information from computer 602. These may include a display (e.g., monitor 604), printers, non-visual displays such as audio output devices, etc.

Communications interface 610 provides an interface to other communication networks and devices and may serve as an interface to receive data from and transmit data to other systems, WANs and/or the Internet, via a wired or wireless communication network 622. Embodiments of communications interface 610 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 610 may be coupled to a computer network, to a FireWire® bus, or the like. In other embodiments, communications interface 610 may be physically integrated on the motherboard of computer 602, and/or may be a software program, or the like.

RAM 618 and non-volatile storage drive 620 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 618 and non-volatile storage drive 620 may be configured to store the basic programming and data constructs that provide the functionality of various embodiments of the present invention, as described above.

Software instruction sets that provide the functionality of the present invention may be stored in computer-readable medium 612, RAM 618, and/or non-volatile storage drive 620. These instruction sets or code may be executed by the processor(s) 614. Computer-readable medium 612, RAM 618, and/or non-volatile storage drive 620 may also provide a repository to store data and data structures used in accordance with the present invention. RAM 618 and non-volatile storage drive 620 may include a number of memories including a main random access memory (RAM) to store instructions and data during program execution and a read-only memory (ROM) in which fixed instructions are stored. RAM 618 and non-volatile storage drive 620 may include a file storage subsystem providing persistent (non-volatile) storage of program and/or data files. RAM 618 and non-volatile storage drive 620 may also include removable storage systems, such as removable flash memory.

Bus subsystem 616 provides a mechanism to allow the various components and subsystems of computer 602 communicate with each other as intended. Although bus subsystem 616 is shown schematically as a single bus, alternative embodiments of the bus subsystem may utilize multiple busses or communication paths within the computer 602.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

Figure 7:
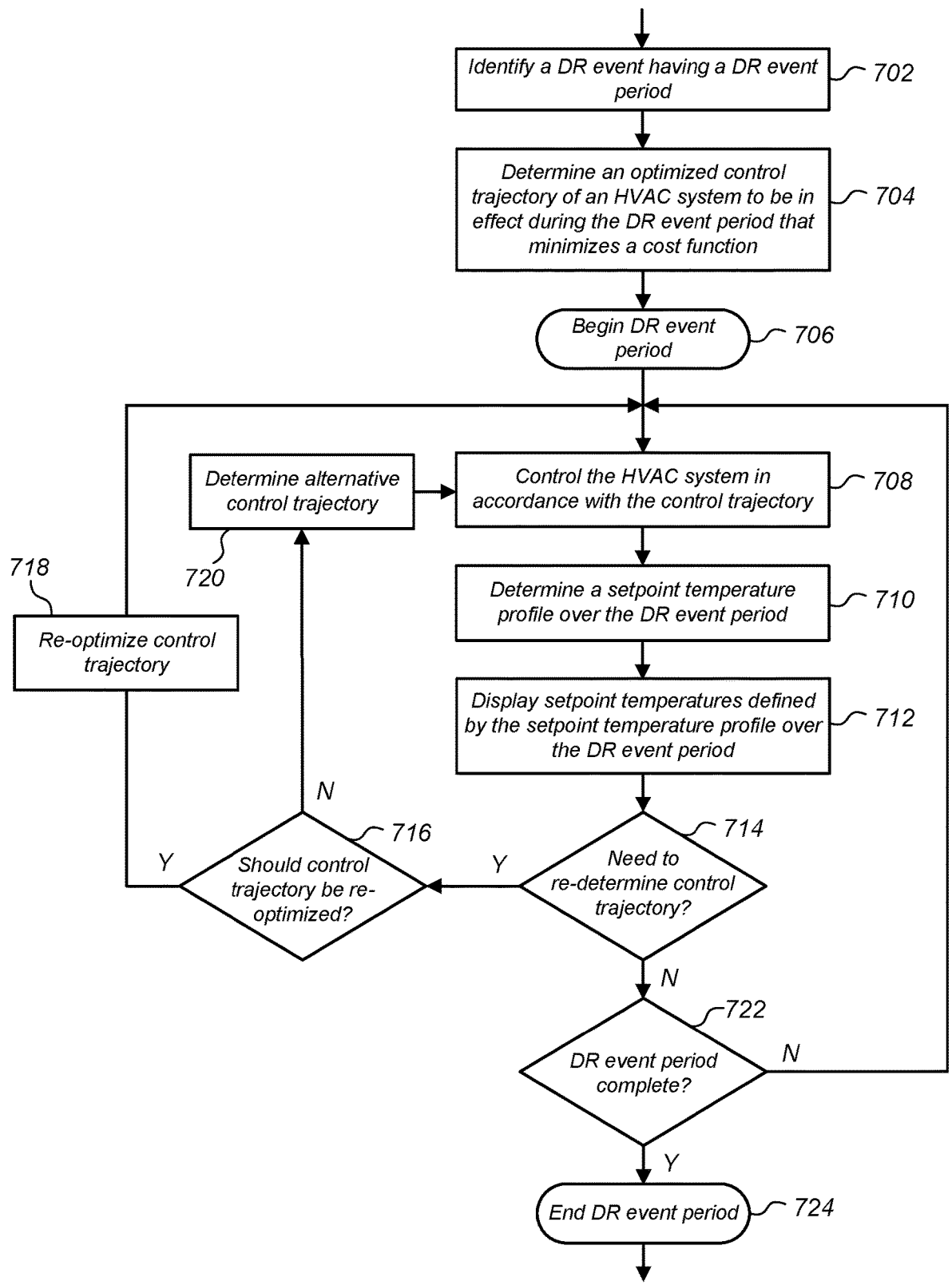
FIG. 7 illustrates a process for controlling an HVAC system during a demand-response event according to an embodiment.

FIG. 7 illustrates a process 700 for controlling an HVAC system during a demand-response event according to an embodiment. To facilitate understanding, the process 700 is described with reference to FIGS. 1, 2, 8, 9A to 9D, 10A to 10B, and 11A to 11B, although it should be understood that embodiments of the process 700 are not limited to those described with reference to FIGS. 1, 2, 8, 9A to 9D, 10A to 10B, and 11A to 11B.

In operation 702 a DR event having a DR event period is identified. A DR event is a time period over which energy reduction mechanisms are to be actively engaged. The DR event is defined by a DR event profile which includes information identifying a DR event period which defines the time period over which energy reduction mechanisms are to be actively engaged. The time period may be on the order of minutes, tens of minutes, hours, tens of hours, or other suitable time period for which energy shifting is desired. In at least one embodiment, a DR event period may be on the order of a few minutes and referred to as an 'instantaneous DR event', which is an event narrowly tailored to an expected peak in aggregate energy demand. In such instances the peak in energy demand may be identified a few minutes (or a few hours) prior to the expected peak time, and in some embodiments the duration of the peak energy demand (i.e., the duration during which expected demand exceeds supply) may last only a few minutes.

In some embodiments, a DR event may be part of a DR program. A DR program is a program that attempts to reduce load on the electrical grid supplying the energy consumer residences 150A-150N during certain critical times which are generally times when demand gets close to or is expected to exceed supply. The DR program often allows for participation in the program by the energy consumers to be voluntary, although in some embodiments participation may be mandatory. In exchange for participation, the energy consumers are often rewarded monetary incentives, reward-based incentives, or other types of incentives to garner increased participation, but in some embodiments the energy consumers may not be provided such incentives. A DR program may run for set periods, such as for a certain number of months, days, years, may be seasonal (e.g., implemented in seasons such as summer when energy demand is expected to increase substantially), may be perpetual, and/or may be executed over any suitable period of time. In its efforts to reduce energy consumption over specifically defined periods, a DR program may define one or more DR events.

The DR event, in addition to having a time period, may also include other information suitable for effectively managing energy consumption over the DR event period. For example, the DR event may also include information identifying a DR event magnitude which defines a magnitude of the desired energy reduction (either on a per-consumer basis, a group basis, an aggregate basis, or other basis). For another example, the DR event may include information identifying a geographical scope of the DR event, where the geographical scope may describe a region that relates to one or more electrical grids from which load shedding is desired. The region may be defined using any suitable parameters such as state, county, zip code, address, or the like, or may identify one or more particular electrical grids from which such addresses of residences may subsequently be inferred. In some embodiments, the DR program may also identify costs per unit of energy over the course of the DR program, DR events, etc. In other embodiments, consumers may be grouped according to characteristics other than geographical characteristics. For example, consumers may be grouped based on similar (or different) characteristics regarding their structures (e.g., thermal retention), their affluency (e.g., absolute wealth, annual income, etc.), their tendency to participate in DR events and/or programs, the amount of energy shifting likely achieved by their participation in a DR event and/or program, etc.

A particular DR event may be identified by a device, such as thermostat 202, in any one or more of a variety of fashions. For example, information identifying a DR event may be communicated from remote server 264, or other computing element of energy management system 130 and/or utility provider computing system 120, to thermostat 202. For another example, thermostat 202 may generate and/or define a DR event based on sensed information. For example, thermostat 202 may monitor outdoor temperature or otherwise receive information regarding outdoor temperature, and based on the outdoor temperature define a DR event (e.g., thermostat 202 may generate a DR event when the outdoor temperature exceeds some value). For another example, thermostat 202 may monitor grid conditions (e.g., variations or other characteristics in power supplied via power distribution network 160), and based on those grid conditions define a DR event. For yet another example, thermostat 202 may be in communication with other thermostats arranged in the same or different structures in a similar geographical area as thermostat 202, and may receive information indicative of a DR event from those other thermostats.

In operation 704 an optimized control trajectory of an HVAC system is determined to be in effect during the DR event period, where the optimized control trajectory minimizes a cost function. The control trajectory indicates how the HVAC system should be controlled over a period of time, such as the DR event period. The control trajectory may include one or more of a variety of tangible control sequences for controlling the HVAC system, such as a schedule of setpoint temperatures, an HVAC duty cycle schedule, etc. Based at least in part on an original control trajectory (e.g., a schedule of setpoint temperatures initially defined by a user to be implemented during the DR event period, and perhaps over a regular periodic interval), a space of possible control trajectories may be searched to find an optimal control trajectory that is optimal in some sense. In many embodiments, the optimal control trajectory is optimal in that it minimizes a cost function.

The cost function, in determining a cost of a particular control trajectory, may incorporate one or more of a variety of factors. For example, the cost function may include a factor representative of a total energy consumption during the DR event period. This factor may indicate, for example, the total energy (kW), or a value ($) of the total energy likely to be consumed by the HVAC system during the DR event period in the event the HVAC system is controlled in accordance with the particular control trajectory. In some cases the value of the total energy may be determined based on real-time energy pricing. For example, in time-of-use environments, wherein the price of energy may vary over the course of the day, the factor representative of total energy consumption may indicate a value of the energy consumed over a period of the day (e.g., the DR event period), where the value of the energy consumed is determined based on both the magnitude of energy consumed at a number of time instances over the period and a cost of energy at those time instances.

The cost function may additionally or alternatively include a factor representative of a metric of occupant discomfort. This factor may indicate, for example, a level of discomfort likely to be experienced by one or more of the occupants of the structure in the event the HVAC system is controlled in accordance with the particular control trajectory. In some embodiments, such a factor may be indicative of discomfort of any arbitrary occupant of the structure. In other embodiments, the occupant(s) likely to be present during a DR event period may be specifically identified, and the discomfort factor may be specifically tailored to that/those specific individual(s).

The cost function may additionally or alternatively include a factor representative of deviations of a rate of energy consumption over the DR event period. During a DR event period, an HVAC system may consume high amounts of energy during a first portion of the event period, and low amounts of energy during a last portion of the event period, or vice versa. In some embodiments, the HVAC system energy consumption may be distributed or otherwise equalized across the DR event period such that the rate of consumption over the DR event period is substantially constant.

In a variety of embodiments, the factors used by the cost function may be weighted the same or differently, such that they are all given equal consideration in determining a cost of a particular control trajectory, or one factor may be given more weight than another. The weightings may be determined based on one or more of a variety of information, such as a user input indicative of a user amenability to DR load shifting, occupant characteristics (e.g., age, income, net worth, health, spending habits, energy-management habits, lifestyle, occupancy times as defined, for example, by an occupancy probability profile, etc.), structure characteristics (size, number of rooms/bathrooms/etc., type of windows, type of insulation, type of electronic devices of structure, whether windows and/or doors are open/closed, etc.), or other characteristics indicative of a users' tendency to prefer energy-savings over comfort or vice versa.

For example, an occupancy probability profile may be used to determine a likelihood of the structure being occupied during the DR event period, where a greater likelihood results in a greater weighting of likely discomfort. For another example, if a user had refused to participate in a previous DR event, such information may result in a greater weighting of likely discomfort and/or a lower weighting of energy consumption savings. For another example, the factors may be weighted based on the age of occupants, where if the occupants include children or elderly, such information may result in a greater weighting of likely discomfort. For another example, the factors may be weighted based on the health of the occupants, where if occupants recently went to the hospital, such information may result in a greater weighting of likely discomfort. For yet another example, the factors may be weighted based on characteristics of other devices in the structure, or even the structure itself, where if other devices are energy-saving devices (e.g., Energy Star® compliant), or the structure includes energy-saving features (e.g., includes cavity-wall insulation, multipane windows, etc.), such information may correspond to an increased weighting on energy consumption savings. For yet another example, the factors may be weighted based on user interaction with a control trajectory during the DR event period, where if a user modifies the temperature to consume less energy, such information may correspond to an increased weighting on energy consumption savings.

Figure 8:
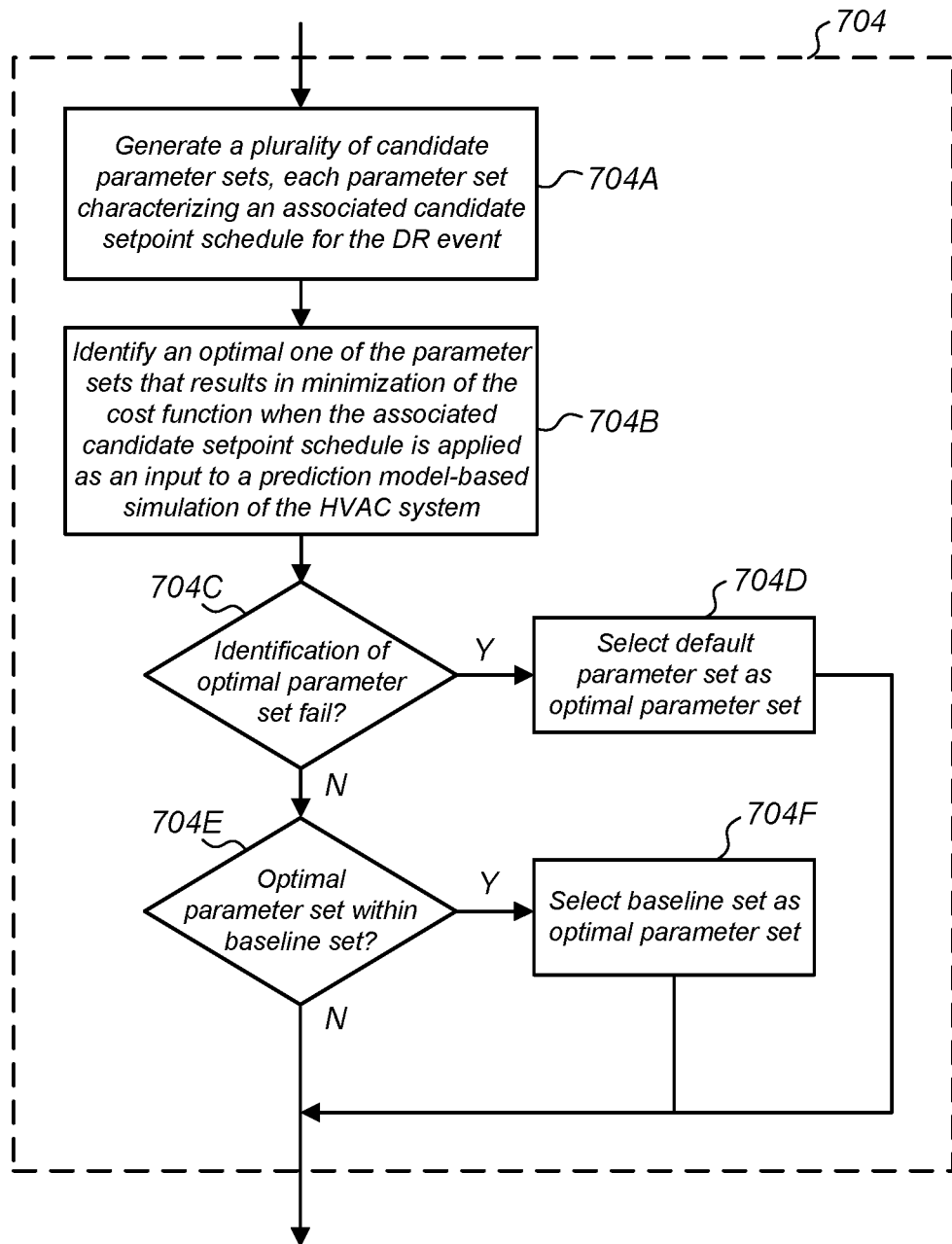
FIG. 8 illustrates a process for determining an optimized control trajectory according to an embodiment.

Turning briefly to FIG. 8, FIG. 8 illustrates a process for determining an optimized control trajectory according to an embodiment which, according to some embodiments, may be a process for determining an optimized control trajectory as described with reference to operation 704. To facilitate understanding, the process 704 is described with reference to FIGS. 1, 2, 9A to 9D, and 10A to 10B, although it should be understood that embodiments of the process 704 are not limited to those described with reference to FIGS. 1, 2, 9A to 9D, and 10A to 10B.

Figure 9A:
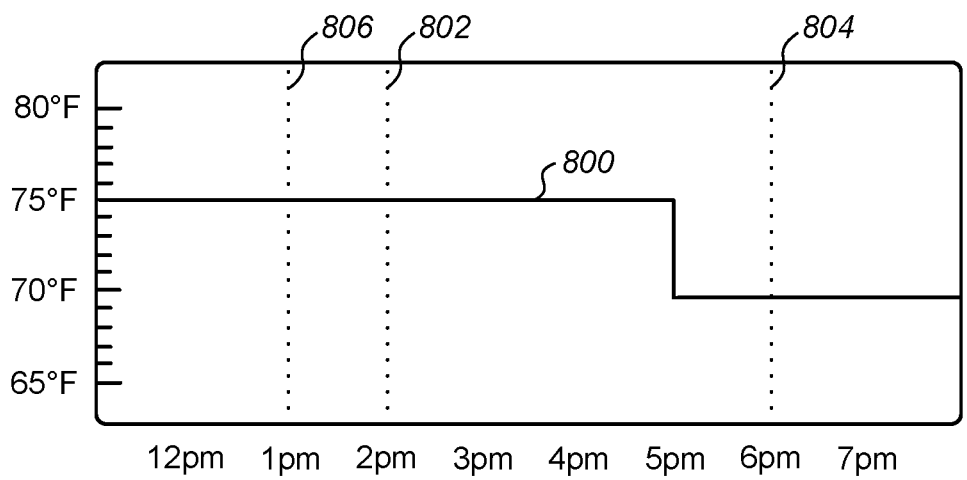
FIG. 9A illustrates a schedule of original setpoint temperatures that are scheduled setpoint temperatures defined prior to determining an optimized control trajectory according to an embodiment.

In operation 704A, a plurality of candidate parameter sets are generated, where each parameter set characterizes an associated candidate setpoint schedule for a DR event. Each parameter set includes a plurality of parameters each having a parameter value, where the parameters in the set, and their corresponding parameter values, characterize a specific setpoint schedule. For example, turning briefly to FIG. 9A, FIG. 9A illustrates a schedule of original setpoint temperatures 800 that are scheduled setpoint temperatures defined prior to determining an optimized control trajectory according to an embodiment. The original schedule may have been generated in one or more of a variety of fashions. For example, the schedule may be set by a user of thermostat 202, and may be input for storage in thermostat 202 via a user interface of thermostat 202, access device 266, and/or another computing device of smart home environment 200. The schedule may be generated by an entity of smart home environment 200, such as the thermostat 202 itself, by learning the tendencies and preferences of the occupants of the structure associated with the thermostat 202. The original schedule may be generated by an entity of system 100 other than smart-home environment 200, such as by remote server 264, energy management system 130, or another entity of system 100, and either pre-programmed in the thermostat 202 prior to installation of the thermostat 202 or communicated to the thermostat 202 post-installation. In some embodiments, the original schedule of setpoint temperatures may be generated based on a combination of one or more of the above. For example, the original schedule may initially be defined by the energy consumer, and subsequently tailored via learning.

The schedule of original setpoint temperatures 800 is defined over a period of time (in this example, from before noon until after 7 pm) including a DR event period extending between a DR event period begin time 802 and a DR event period end time 804. In some embodiments, the DR event period may also include a pre-event period extending between a pre-event period begin time 806 to the DR event period begin time 802. In some embodiments, the DR event period may also include a post-event period extending between the DR event period end time 804 and a post-event period end time that is sometime after the DR event period end time (not shown). In some embodiments, the DR event period may include one or both of a pre-event period and a post-event period.

Figure 9B:
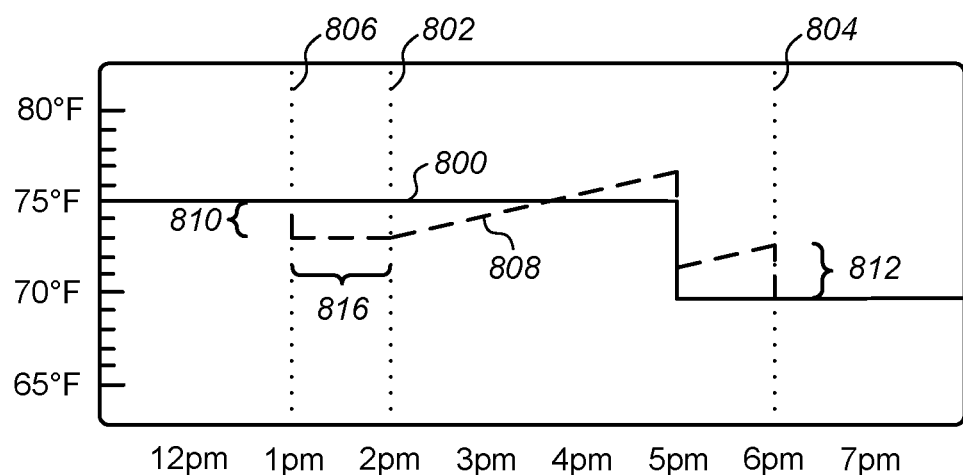
FIG. 9B illustrates a schedule of candidate setpoint temperatures characterized by a parameter set according to an embodiment.

FIG. 9B illustrates a schedule of candidate setpoint temperatures 808 characterized by a parameter set according to an embodiment. The parameter set in this particular embodiment includes a first parameter 810 that indicates a temperature-wise offset from a first temperature setpoint of the schedule of original setpoint temperatures 800 (i.e., a temperature setpoint defined at the beginning of the pre-event period 806). In this particular example, the offset is 2° F. in a direction of increased energy consumption with respect to the corresponding original setpoint. That is, in this particular example, the outdoor temperature is greater than the indoor temperature and an air conditioning system is actuated to reduce the indoor temperature in accordance with the original and/or candidate schedule. The optimized schedule of setpoint temperatures should ultimately reduce the amount of energy consumed during the DR event period. To assist in such a reduction, a pre-cooling is performed during the pre-event period. In this particular example, pre-cooling is performed over the course of the pre-event period (i.e., from 1 pm to 2 pm), at a temperature offset defined by the first parameter 810.

The parameter set also includes a second parameter 812 that indicates a temperature-wise offset from a last temperature setpoint of the schedule of original setpoint temperatures 800 (i.e., a temperature setpoint defined at the end of the DR event period 804). In this particular example, the offset is 3° F. in a direction of decreased energy consumption with respect to the corresponding original setpoint. That is, in this particular example, the indoor temperature is allowed to rise 3° F. by the end of the DR event period as compared to the schedule of original setpoint temperatures.

Figure 9C:
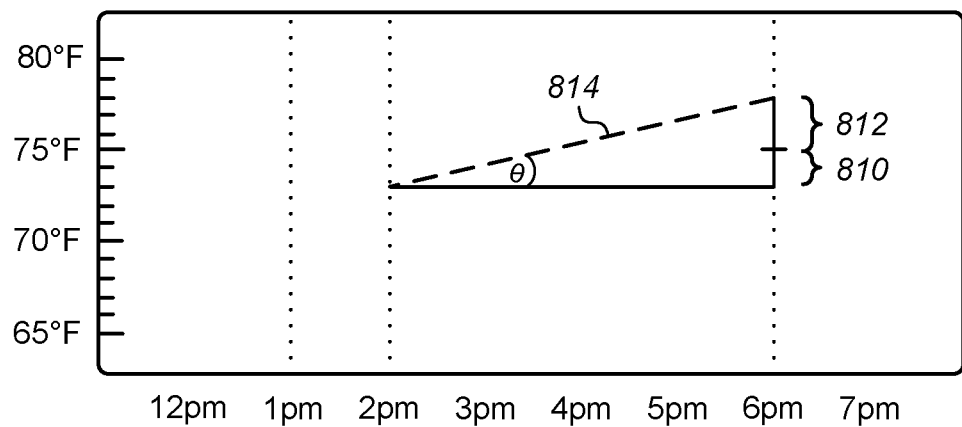
FIG. 9C illustrates a relationship between the first parameter, the second parameter, and a linear sequence of temperature setpoints according to an embodiment.

The first parameter 810 and the second parameter 812 can be used to define a slope of a linear sequence of temperature setpoints that may be used to determine the candidate schedule. For example, turning to FIG. 9C, FIG. 9C illustrates a relationship between the first parameter 810, the second parameter 812, and a linear sequence 814 of temperature setpoints according to an embodiment. The first 810 and second parameter 812 indicate a magnitude of maximum temperature change over a time period with respect to an arbitrary reference temperature. In this particular example, the time period is the DR event period (i.e., between the DR event period begin time 802 and the DR event period end time 804), and the arbitrary reference temperature is 73° F. Linear sequence 814 is then the linear sequence of temperature setpoints that increase from the reference temperature to the combined magnitude of the first and second parameters over the DR event period, and has a slope defined by the DR event period and the combined magnitude of the first and second parameters.

Turning back to FIG. 9B, the slope defined by the DR event period and the combined magnitude of the first and second parameters may be used to determine the candidate schedule of setpoint temperatures 808 such that deviations in the rate of energy consumption over the DR event period are reduced. In this particular example, the candidate setpoint temperatures 808, after being offset by a magnitude defined by the first parameter 810 from the pre-event period begin time 806 to the DR event period begin time 802, begin to increase linearly at a rate of change defined by the slope of the linear sequence 814. In cases where the original schedule of setpoint temperatures transitions from one temperature to another temperature, such as the temperature change from 75° F. to 70° F. at 5 pm, the candidate setpoint temperatures 808 continue to increase linearly, from the newly transitioned setpoint temperature, at the rate of change defined by the slope of the linear sequence 814. In other words, a change in temperature magnitude in the original schedule (e.g., a drop of 5° F. in the original schedule 808 at 5 pm) is similarly reflected as a corresponding change in temperature in the candidate schedule 808 (e.g., a drop of 5° F. in the original schedule 808 at 5 pm).

While this particular embodiment is described with reference to a first parameter 810 that indicates a temperature-wise offset from a first temperature setpoint of the schedule of original setpoint temperatures 800, and a second parameter 812 that indicates a temperature-wise offset from a last temperature setpoint of the schedule of original setpoint temperatures 800, embodiments are not so limited. For example, in some embodiments a first parameter may indicate a temperature-wise offset from any setpoint of the original schedule 800. This may be an offset at the pre-event period begin time 806, the DR event period begin time 802, the DR event period end time 804, somewhere in-between any of those times, or somewhere outside of those times. For example, with reference to FIG. 9B, this may be an offset of 0° F. from the 4 pm temperature setpoint of 75° F. defined by the original schedule 800. A second parameter may then indicate a slope of a linear sequence of temperature setpoints passing through a point at the temperature-wise offset from the temperature setpoint of the original setpoint schedule. For example, the second parameter may indicate a slope of a linear sequence of temperature setpoints passing through the setpoint temperature of 75° F. at 4 pm, where the slope is an increase in temperature of 1° F. per hour. These two factors may then be used to determine the schedule of candidate setpoint temperatures 808, where the original schedule 800 is modified to have a slope of 1° F. per hour with a 0° F. at 4 pm.

It should be recognized that the original schedule 800 and modified schedule 808 as described with reference to FIGS. 9A and 9B are merely used for explanation purposes and the scope of the embodiments are not intended to be so limited. For example, the aforementioned slope could be greater or less than 1° F. per hour, could be positive (as shown) or negative, and could be constant (as shown) or variable over the DR event period. The modified schedule 808 may include a temperature setpoint over the pre-event period that is constant (as shown) or variable (e.g., it may have a slope the same as or different than the aforementioned slope), and may have a duration of 1 hr (as shown) or a duration greater or less than 1 hr. Further, the slope may be defined based on a time period extending between the DR event period begin time 802 and the DR event period end time 804 (as described), or between other periods (e.g., between the pre-event period begin time 806 and the DR event period end time 804). Further yet, the schedule of candidate setpoint temperatures 808 may begin changing linearly from a setpoint temperature other than that associated with a temperature offset during the pre-event period. For example, with reference to FIG. 9B, at 2 pm, instead of beginning a linear change from 73° F. (which is the same temperature as defined for the pre-event period between 1 pm and 2 pm), the schedule at 2 pm may begin a linear change from 74° F., 75° F., 76° F., or some other temperature that is different than that defined for the pre-event period.

In some embodiments, and with reference to FIG. 9B, a third parameter 816 is indicative of a duration of the pre-event period. For example, the third parameter 816 may extend between the pre-event period begin time 806 and the DR event period begin time 802, thereby defining a duration of the pre-event period. The third parameter may also or alternatively extend between other periods of time, such as over the post-event period. That is, the third parameter may also or alternatively extend between the DR event period end time 804 and the post-event period end time (not shown).

Figure 9D:
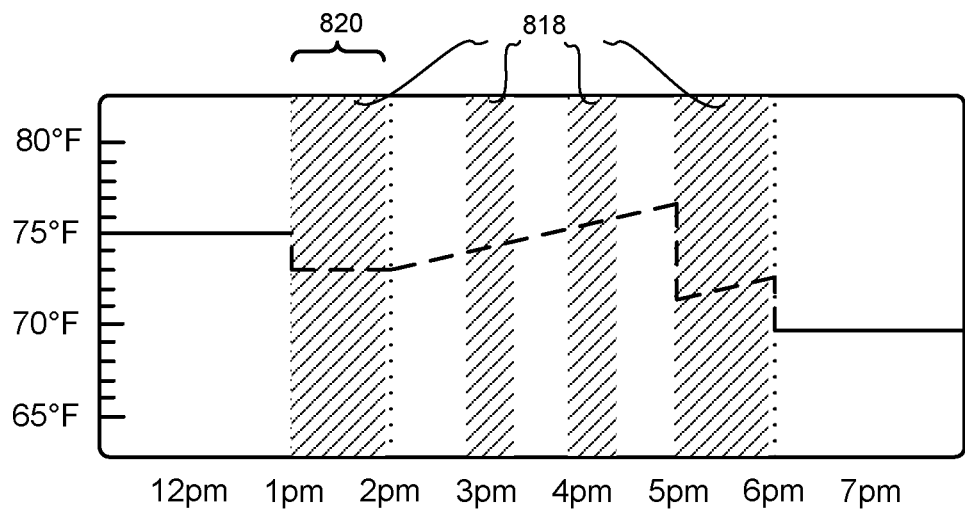
FIG. 9D illustrates a candidate duty cycle schedule that corresponds to the schedule of candidate setpoint temperatures according to an embodiment.

Turning briefly to FIG. 9D, FIG. 9D illustrates a candidate duty cycle schedule that corresponds to the schedule of candidate setpoint temperatures 808 according to an embodiment. That is, the candidate duty cycle schedule indicates a sequence of ON/OFF states that the HVAC system is expected to be controlled in upon implementation of the candidate schedule 808. The candidate duty cycle schedule includes a number of HVAC system ON periods 818, where the HVAC system is controlled to be in an ON state during those periods and in an OFF state outside of those periods. In some embodiments, a fourth parameter 820 is indicative of a maximum HVAC duty cycle period. For example, the maximum HVAC duty cycle period may indicate a maximum ON time of 45 minutes for every 60 minute period. The fourth parameter 820 need not be indicative of a maximum ON time, but similarly could also or alternatively indicate a minimum HVAC OFF time for a given period (e.g., 15 minutes for every 60 minute period).

By defining and optimizing a number of parameters such as the setback temperatures at the beginning and end of the DR event period, the duration of the pre-event period (during which, e.g., pre-cooling may be performed), the maximum duty cycle length, etc., the benefits of up to or more than three energy shifting strategies (setback, pre-cooling, and duty cycle modulation) may be realized while the drawbacks associated with such strategies may be reduced on a home-by-home basis. Further, by optimizing based on a user's preference for energy consumption vs. comfort, an optimal control trajectory may be realized where the control trajectory is optimal for the user's particular preference.

Returning now to FIG. 8, as mentioned, in operation 704A a plurality of candidate parameter sets are generated. For example, a first parameter set may include a first parameter 810 having a value of 2° F., and a second parameter 812 having a value of 3° F., where this particular parameter set characterizes an associated candidate setpoint schedule (e.g., candidate setpoint schedule 808 as shown in and described with reference to FIG. 9B). A second parameter set may include a first parameter 810 having a value of 2.5° F., and a second parameter 812 having a value of 3.5° F., where this particular parameter set characterizes a different candidate setpoint schedule (not shown).

In operation 704B an optimal one of the parameter sets is identified that results in minimization of a cost function when the associated candidate setpoint schedule is applied as an input to a prediction model-based simulation of the HVAC system. That is, one of the parameter sets generated in operation 704A may be identified as being optimal with respect to a cost function.

In performing such an identification, the candidate setpoint schedule for each candidate parameter set may be applied to a prediction model-based simulation of the HVAC system. A prediction model-based simulation of the HVAC system may include, and may continuously update, a model of the HVAC system that is operable to predict the thermodynamic behavior of a structure, for example the model may be operable to predict an indoor temperature profile and/or an HVAC duty cycle schedule for a schedule of setpoint temperatures. The model may be generated/updated using some or all of a variety of information, such as a history of indoor temperature, a history of outdoor temperature, a history of temperature of the structure, characteristics of the HVAC system (e.g., a carryover of a rate of indoor temperature change that was occurring immediately prior to a change in actuation state of the HVAC system), etc. Some particular models and their use in prediction model-based HVAC system simulations are described in commonly assigned and concurrently filed U.S. Ser. No. 13/866,602, entitled "Generating And Implementing Thermodynamic Models Of A Structure," the entire contents of which are incorporated by reference herein in their entirety for all purposes. In some embodiments, rather than using a trained model that is generated based on a history of data as described, a default model may be used whereby the default model provides a default thermodynamic behavior of the structure; e.g., a default relationship between a given control trajectory and an indoor temperature profile.

In response to applying a candidate setpoint schedule to the prediction model-based simulation of the HVAC system, a predicted indoor temperature profile and/or HVAC duty cycle schedule for the candidate setpoint schedule may be generated. The predicted indoor temperature profile and/or HVAC duty cycle schedule for the candidate setpoint schedule may then be used in the cost function to determine a cost associated with the candidate setpoint schedule. For example, the predicted HVAC duty cycle schedule may be used to determine an amount of total HVAC usage and/or cost for the expected HVAC usage over the DR event period for the candidate setpoint schedule. For another example, the predicted indoor temperature profile may be used to determine a metric indicative of occupant discomfort were the candidate setpoint schedule implemented over the DR event period.

In some particular embodiments, in identifying an optimal parameter set the space of parameter sets may be searched to identify the parameter set that minimizes the aforementioned cost function. By searching a space of parameter sets, where each parameter set includes a limited number of parameters (e.g., an offset and a slope), rather than a space defined by each of the temperature setpoints of a candidate schedule (which may be numerous), the search for an optimal schedule may advantageously be significantly expedited. Such a search may thus be performed by relatively low-power devices (or devices having a relatively low computational complexity) such as a thermostat, and may be performed on a regular basis (e.g., every 15 minutes) without unduly burdening the device.

In operation 704C it is determined whether identification of an optimal parameter set failed. The identification of an optimal parameter set may fail for any one or more of a variety of reasons. For example, the minimization algorithm may fail to identify a local or global minimum of the cost function. If the identification fails, processing may continue to operation 704D where a default parameter set is selected as the optimal parameter set. The default parameter set may be a set of parameters that result in at least some energy reductions over the DR period as compared to the user's original schedule. For example, the first parameter 810 may be a 1° F. temperature offset in the direction of increased energy consumption while the second parameter 812 may be a 1° F. temperature offset in a direction of decreased energy consumption. Such a parameter set may result in less energy consumption over the DR event period as compared to the original schedule, but may not be optimal in terms of minimizing energy consumption, occupant discomfort, etc.

Otherwise, if identification of the optimal parameter set does not fail, processing may continue to operation 704E. In operation 704E it is determined whether the optimal parameter set is within a baseline set. A baseline parameter set may be a parameter set that corresponds to the original setpoint schedule. In determining whether the optimal parameter set is within the baseline set, it may be determined whether the duty cycle schedule characterized by the optimal parameter set is identical to, or within some tolerance of, the duty cycle schedule characterized by the original setpoint schedule. In other words, it may be determined whether the optimal schedule is expected to result in the HVAC system being controlled in a similar fashion as if the HVAC system was to be controlled in accordance with the original schedule. To make such a determination the predicted duty cycle schedule characterized by the optimal parameter set and the original setpoint schedule may be compared. If the duty cycle schedules are identical or similar to one another, then it may be determined that the optimal parameter set is within the baseline set. Otherwise, it may be determined that the optimal parameter set is not within the baseline set.

Figure 10A:
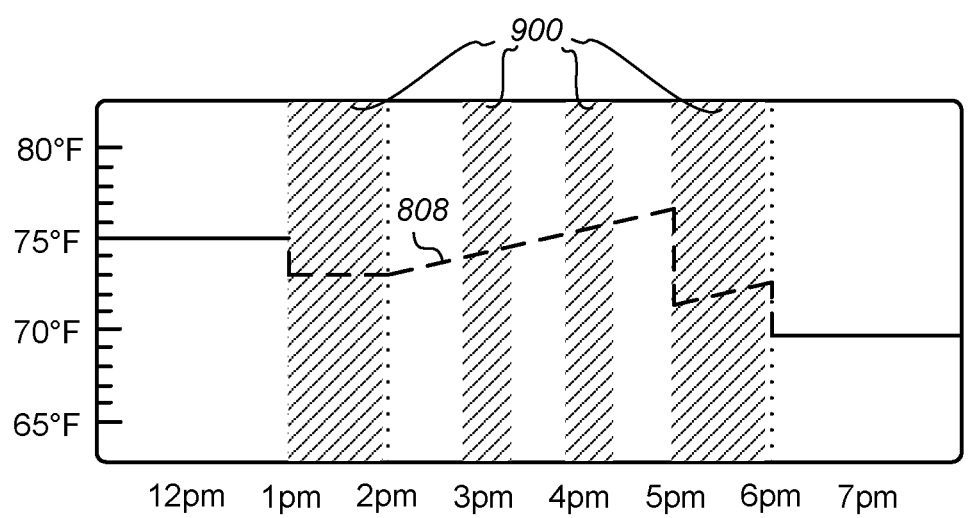
FIG. 10A illustrates a predicted HVAC duty cycle resulting from implementation of an optimal setpoint schedule according to an embodiment.
Figure 10B:
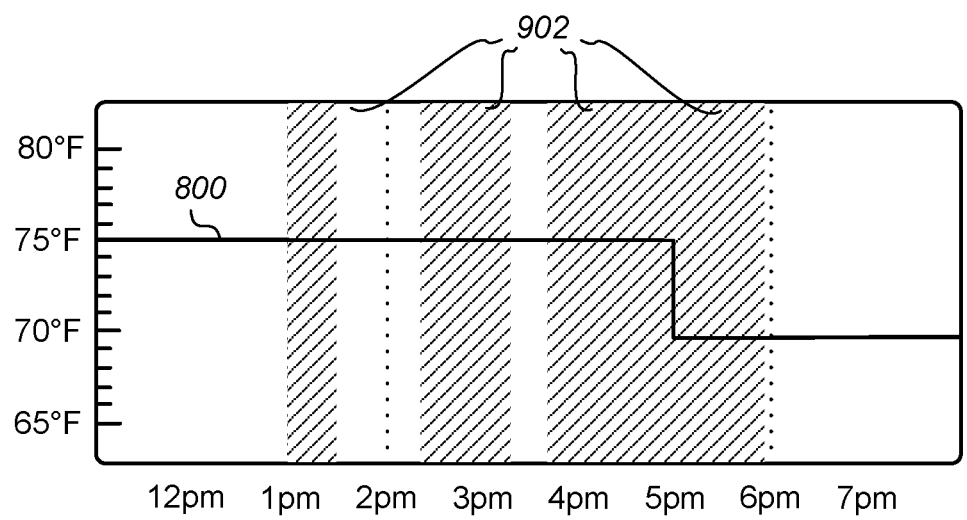
FIG. 10B illustrates a predicted HVAC duty cycle resulting from implementation of an original setpoint schedule according to an embodiment.

For example, turning briefly to FIGS. 10A and 10B, FIG. 10A illustrates a predicted HVAC duty cycle 900 resulting from implementation of an optimal setpoint schedule 808 according to an embodiment. The HVAC duty cycle 900 includes HVAC ON periods beginning at approximately 1 pm, 3 pm, 4 pm, and 5 pm, where the HVAC ON periods beginning at 1 pm and 5 pm each last for approximately 50 minutes, and the HVAC ON periods beginning at 3 pm and 4 pm each last for approximately 30 minutes. FIG. 10B illustrates a predicted HVAC duty cycle 902 resulting from implementation of the original setpoint schedule 800 according to an embodiment. The HVAC duty cycle 902 includes HVAC ON periods beginning at approximately 1 pm, 2:30 pm, and 3:50 pm, with durations ranging from 30 minutes to over 2 hours.

In this particular example, to facilitate operation 704E, the HVAC duty cycle 900 may be compared to the HVAC duty cycle 902. If the duty cycles are identical or similar, then the original setpoint schedule 800 may be used rather than optimal schedule 808. A variety of characteristics of the duty cycles may be used in the comparison, such as the HVAC ON times, HVAC ON periods, HVAC OFF times, and HVAC OFF periods, where schedules within 5% (or some other threshold greater than or less than 5%) of one another may be considered similar.

Returning to FIG. 8, if it is determined that the optimal parameter set is within the baseline set, then processing may continue to operation 704F where the baseline parameter set is selected as the optimal parameter set. That is, instead of using a setpoint schedule characterized by the optimal parameter set to subsequently control the HVAC system, the original setpoint schedule may be selected and used. In this fashion, the HVAC system may be advantageously controlled precisely as expected by the user, thereby increasing the likelihood of the original setpoint schedule, which in this particular case is substantially optimal, being accepted or otherwise not interfered with by the user for the duration of the DR event period.

It should be appreciated that the specific operations illustrated in FIG. 8 provide a particular process for illustrates a process for determining an optimized control trajectory according to an embodiment. The various operations described with reference to FIG. 8 may be implemented at and performed by one or more of a variety of electronic devices or components described herein. For example, they may be implemented at and performed by one or more electronic devices in the smart home environment 200 (e.g., thermostat 202), the energy management system 130 (e.g., remote server 264), etc. Other sequences of operations may also be performed according to alternative embodiments. For example, alternative embodiments of the present invention may perform the operations outlined above in a different order. Moreover, the individual operations illustrated in FIG. 8 may include multiple sub-operations that may be performed in various sequences as appropriate to the individual operations. Furthermore, additional operations may be added or existing operations removed depending on the particular applications.

Returning now to FIG. 7, once an optimized control trajectory has been determined, the DR event period may begin in operation 706. Once the DR event period begins, processing may continue to operation 708, where the HVAC system is controlled in accordance with the control trajectory. For example, where the HVAC control trajectory includes a schedule of setpoint temperatures, thermostat 202 may control HVAC 203 in an attempt to reach and/or maintain those temperatures within a particular error threshold. For another example, where the HVAC control trajectory includes an HVAC duty cycle schedule, thermostat 202 may control an ON/OFF state of HVAC 203 in accordance with the duty cycle schedule. The particular control trajectory used may be that determined as a result of operation 704, and thus may be the control trajectory resulting from optimization of the cost function, a default control trajectory, and/or the original control trajectory.

In operation 710, a setpoint temperature profile over the DR event period may be determined. The setpoint temperature profile may be determined based on the particular control trajectory being used. For example, if the original setpoint schedule is used, then the setpoint temperature profile may correspond to the setpoint temperatures defined by the original setpoint schedule. Similarly, if the default or optimal setpoint schedules are used, then the setpoint temperature profile may correspond to the setpoint temperatures defined by the default or optimal setpoint schedules. In embodiments where the implemented setpoint schedule includes setpoint temperatures with a high rate of change over the DR event period, for example, setpoint temperatures that change every 5, 10, or 15 minutes (see, e.g., candidate schedule 808 in FIG. 9B, where the setpoint temperatures continuously change over the DR event period), it may be desirable to reduce the rate of change of setpoint temperatures displayed or otherwise communicated to the user. In some embodiments, this may be done by suppressing display of the actual setpoint temperature in exchange for effective temperature setpoints (i.e., temperature setpoints that, if used to control the HVAC system, would be expected to cause the HVAC system to be controlled as it is actually being controlled in accordance with the selected control trajectory).

Figure 11A:
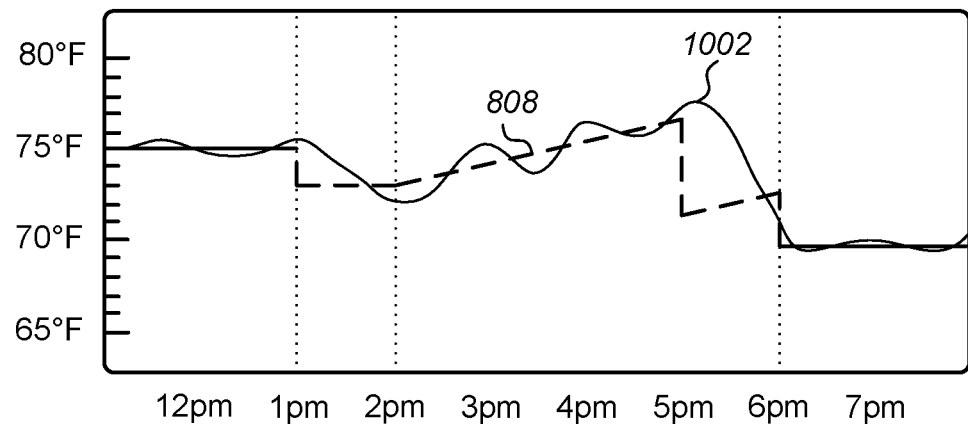
FIG. 11A illustrates an expected indoor temperature profile resulting from implementation of the optimal schedule according to an embodiment.
Figure 11B:
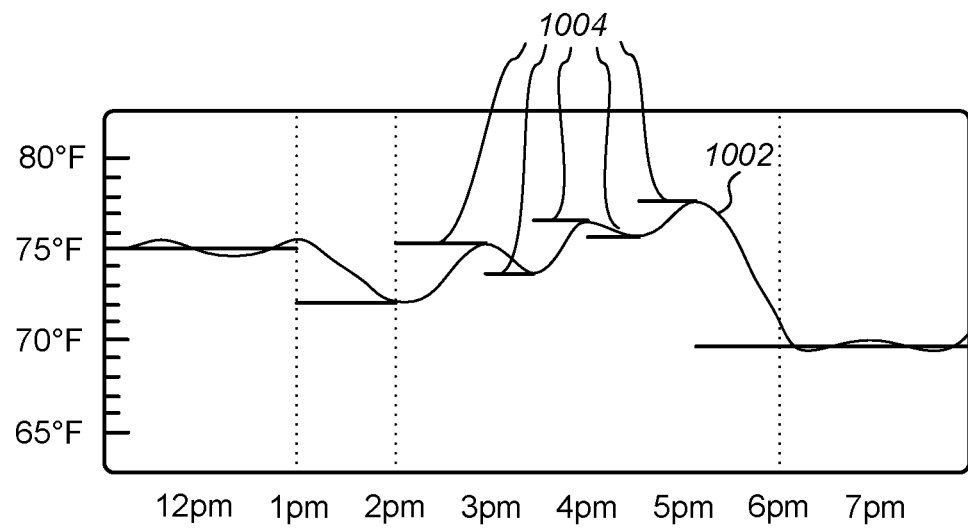
FIG. 11B illustrates effective setpoint temperatures relative to the expected indoor temperature profile according to an embodiment.

For example, turning briefly to FIGS. 11A and 11B, FIG. 11A illustrates an expected indoor temperature profile 1002 resulting from implementation of the optimal schedule 808 according to an embodiment. The expected indoor temperature profile 1002 may be determined by applying the optimal setpoint schedule 808 to the prediction model-based simulation of the HVAC system. FIG. 11B illustrates effective setpoint temperatures 1004 relative to the expected indoor temperature profile 1002 according to an embodiment. The effective setpoint temperatures 1004 may be determined by identifying the peaks and troughs of the expected indoor temperature profile 1002. For example, an effective temperature setpoint may be defined as a peak temperature (e.g., at 3 pm) for a duration extending from a previous trough (e.g., at 2 pm) to the time at which the peak temperature is located (i.e., at 3 pm). Similarly, an effective temperature setpoint may be defined as a trough temperature (e.g., at 3:30 pm) for a duration extending from a previous peak (e.g., at 3 pm) to the time at which the trough temperature is located (i.e., at 3:30 pm). The combination of effective setpoint temperatures 1004 may then be used as the setpoint temperature profile. That is, instead of using the (continuously changing) setpoint temperatures defined by the optimal schedule 808 as the setpoint temperature profile, the (relatively static) sequence of effective setpoint temperatures 1004 may be used. In such a fashion, when displayed to the user, the user is not presented with the appearance of a continuously changing schedule (e.g., schedule 808), but rather is presented with the appearance of a relatively static schedule (e.g., as defined by the combination of effective temperature setpoints 1004). The presentation of a relatively static schedule may advantageously reduce the likelihood of user interference with implementation of the optimal schedule.

Returning to FIG. 7, once the setpoint temperature profile is determined, the setpoint temperatures defined by the setpoint temperature profile may be displayed, or otherwise communicated to the user, during the DR event period in operation 712. For example, the effective setpoint temperatures 1004 may be sequentially displayed on thermostat 202 as a current setpoint temperature over the course of the DR event period.

While the HVAC system is controlled in accordance with the determined control trajectory, processing may continue to operation 714 where it is determined whether there is a need to re-determine the control trajectory. There may be a variety of reasons for the control trajectory to be re-determined, such as the actual HVAC states and/or indoor temperatures being different than the expected HVAC states/indoor temperatures, a real-time occupancy of the structure changing, the indoor temperatures crossing some safety thresholds, etc. In some particular embodiments, the control trajectory may be re-determined when: (1) where an optimal schedule is implemented, the actual indoor temperature profile is different than the predicted indoor temperature profile; (2) where the original schedule is implemented as it's deemed to result in similar control as an optimal schedule, the actual indoor temperature profile crosses some safety thresholds; (3) a real-time occupancy of the structure changes; and/or (4) where an optimal or original schedule is implemented, the actual HVAC states are different than the predicted HVAC states.

In making such a determination, a variety of information may be monitored. For example, an actual indoor temperature of the structure may be monitored during the DR event period and compared to the expected indoor temperature profile. For another example, the actual HVAC states may be monitored and compared to the expected HVAC states defined by the expected HVAC duty cycle schedule. For yet another example, an occupancy status of the structure may be monitored.

If it is determined that the control trajectory needs to be re-determined, then processing may continue to operation 716. In operation 716 it is determined whether the control trajectory should be re-optimized. In some cases, the control trajectory may be re-optimized as described with reference to operation 704, whereas in other cases an alternative control trajectory, such as one characterized by the original setpoint schedule or the default setpoint schedule, may be used in place of an optimal schedule. For example, in situations where the occupancy status of the structure changed, then the control trajectory may be re-optimized. For another example, in situations where the current control trajectory is characterized by an optimal setpoint schedule or original setpoint schedule and the actual HVAC state differs from the expected HVAC state, then the control trajectory may be re-optimized. For another example, in situations where the current control trajectory is characterized by an optimal setpoint schedule and the actual indoor temperature profile differs from the expected indoor temperature profile, then the default control trajectory may be implemented. For yet another example, in situations where the current control trajectory is characterized by the original setpoint schedule and the some safety thresholds are exceeded (e.g., HVAC ON period exceeds a maximum duration), then the default control trajectory may be implemented.

If it is determined that the control trajectory should be re-optimized, processing may continue to operation 718 where the control trajectory is re-optimized. Re-optimization of the control trajectory may be similar to the original optimization described with reference to operation 704, thus further description is omitted. Upon re-optimization of the control trajectory, processing may return to operation 708 where the HVAC system is then controlled in accordance with the re-optimized control trajectory. If, on the other hand, it is determined that the control trajectory should not be re-optimized but rather that an alternative control trajectory should be determined, then processing may continue to operation 720 where an alternative control trajectory, such as one characterized by the default schedule or the original schedule, is determined. Processing may then return to operation 708 where, in this case, the HVAC system is controlled in accordance with the alternative control trajectory.

Returning to operation 714, if there is no need to re-determine the control trajectory, then processing may continue to operation 722 where it is determined whether the DR event period is complete. If it is not, processing may return to operation 708 where the HVAC system is controlled in accordance with the control trajectory. Otherwise, processing may continue to operation 724 where the DR event period is completed.

It should be appreciated that the specific operations illustrated in FIG. 7 provide a particular process for controlling an HVAC system during a demand-response event according to an embodiment. The various operations described with reference to FIG. 7 may be implemented at and performed by one or more of a variety of electronic devices or components described herein. For example, they may be implemented at and performed by one or more electronic devices in the smart home environment 200 (e.g., thermostat 202), the energy management system 130 (e.g., remote server 264), etc. Other sequences of operations may also be performed according to alternative embodiments. For example, alternative embodiments of the present invention may perform the operations outlined above in a different order. Moreover, the individual operations illustrated in FIG. 7 may include multiple sub-operations that may be performed in various sequences as appropriate to the individual operations. Furthermore, additional operations may be added or existing operations removed depending on the particular applications.

A user of a device involved in energy management during a DR event may be presented with one or more of a variety of graphical user interfaces (GUI) on one or more of their devices (e.g., thermostat 202, access device 266, etc.) associated with the energy management system. The GUI's, or other user interfaces, may notify the user that a DR event is ongoing, and in some cases may notify the user that their HVAC system is being controlled in accordance with one or more of the processes described herein. In some particular cases, if, during the DR event period, their HVAC system is no longer controlled in accordance with the aforementioned processes, the user may be notified of such a condition.

Figure 12A:
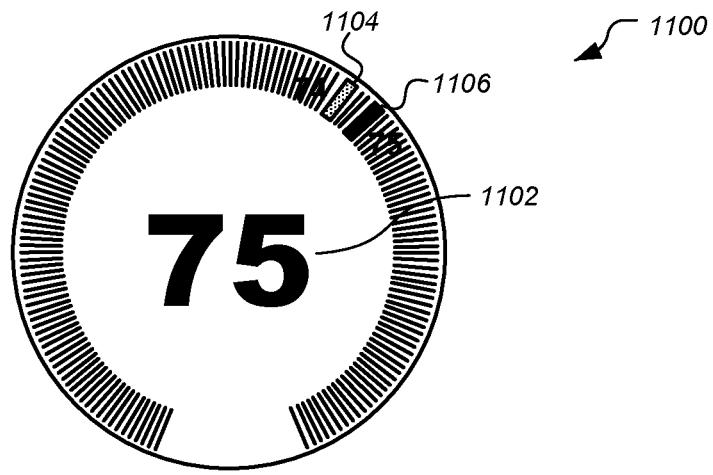
FIGS. 12A and 12B illustrate a simplified graphical user interface (GUI) that may be presented to an energy consumer according to an embodiment.
Figure 12B:
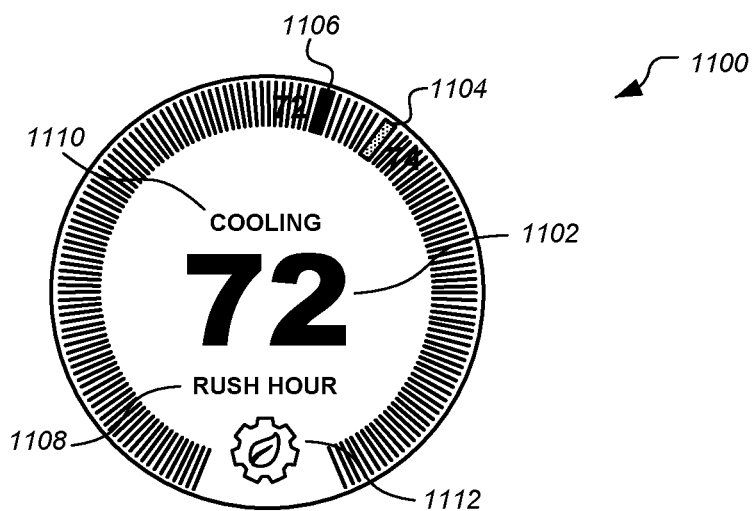

Turning briefly to the figures, FIGS. 12A and 12B illustrate a simplified GUI that may be presented to an energy consumer according to an embodiment. While the GUI is presented in the form of an interface that may be displayed on a circular-shaped device such as the device 300 discussed with reference to FIGS. 3A through 3C, embodiments are not so limited as similar GUI's could be presented on other devices of other shapes.

Specifically, FIG. 12A illustrates GUI 1100 which may be, e.g., user interface 304 (FIG. 3A), output device 606 and/or input device 608 (FIG. 6), or other GUI of an electronic device associated with an energy consumer. The GUI 1100 includes a current setpoint temperature 1102 displaying the immediate setpoint to the user. The GUI 1100 also includes a current temperature indicator 1104 indicating the current temperature inside of the structure, and in some cases a current setpoint temperature indicator 1106 indicating the immediate setpoint and graphically displayed relative to the current temperature indicator 1104.

Turning to FIG. 12B, upon beginning a DR event, the same information as described with reference to FIG. 12A may be displayed. Further, GUI 1100 may also include a DR event indicator 1108 indicating that a DR event is currently ongoing. In this particular example, the DR event indicator 1108 is a textual display of "RUSH HOUR", but in other embodiments the DR event indicator 1108 may take other forms or textual sequences, such as "DR EVENT". Such an indicator may be displayed during the DR event period, but may also be displayed during other time periods associated with the DR event period, such as during the pre-event period and/or post-event period. GUI 1100 may also include an HVAC state indicator 1110 indicating a current state of the HVAC system (e.g., cooling, heating, stage 1, stage 2, etc.).

GUI 1100 may also include a DR event management indicator 1112 that indicates the HVAC system is being controlled in accordance with a DR event optimization process (e.g., an optimal control trajectory is being used). The DR event management indicator 1112 in this particular embodiment is an image of a leaf embedded in a gear, but in other embodiments may assume different graphical forms or shapes. The DR event management indicator 1112, in some embodiments, may indicate that the thermostat is being successfully controlled in accordance with the DR event optimization process (i.e., no user setpoint changes to those defined by the DR event optimization process). In some cases, the DR event management indicator 1112 may be displayed if the setpoint is not altered. For example, if the energy consumer does not alter the current setpoint, then the indicator 1112 may be displayed, but if the energy consumer alters the current setpoint (e.g., increases the temperature by 2° F.), then the indicator 1112 may be removed from the display. In other cases, the DR event management indicator 112 may be displayed even if the setpoint is altered but only if the change does not result in a reduction in energy shift from the DR event period to one or more periods outside of the DR event period.

It has been found especially useful and beneficial to automatically display an iconic symbol to the user during these times (i.e., during the time that the automated schedule adjustment processes described herein are taking place) in association with the user interface, wherein the iconic symbol is designed to simultaneously achieve multiple objectives including reassuring and/or notifying the user that there is an automated process taking place, and that this automated process is directed to achieving an environmentally beneficial objective. It has been found that one particularly useful iconic indicator comprises a symbol of a gear along with a symbol of a leaf embedded therein, the gear being found to connote in the mind of the user that there is an automated process of some sort taking place, and the leaf being found to connote in the mind of the user that this process has a beneficial impact on the environment. In addition to having one advantage that the leaf-in-gear symbol does not need translation into foreign languages, there is furthermore the advantage that the leaf-in-gear symbol is not alarming or threatening to the user, and has a positive connotation such that the user is mildly and subtly encouraged not to take any action that would remove the leaf-in-gear symbol from the user display. At the same time, because there is an associated with automation by virtue of the gear's connotation, the leaf-in-gear symbol is less likely to spur the user into any unnecessary manual interactions with the device.

It should be appreciated that the specific I/O interfaces illustrated in FIGS. 12A and 12B describe particular I/O interfaces according to certain embodiments. The I/O interfaces described with reference to FIGS. 12A and 12B may be implemented at one or more of a variety of electronic devices associated with an energy consumer. For example, they may be implemented at and performed by one or more of the a thermostat 202, hazard detection unit 204, entryway interface device 206, wall light switch 208, wall plug interface 210, appliance 212, access device 266, or other electronic device associated with the identified energy consumer. The various messages and input elements may not necessarily be displayed at different times, but rather some messages could be presented simultaneously on the same display. Similarly, although some messages and information are explained as being presented simultaneously, they be instead be displayed at different times. Some messages could be communicated using other communication mechanisms, and responses could similarly be received using other communication mechanisms. For example, audible, touch, or other input/output mechanisms could be used. Further, it should be recognized that additional or alternative information could be presented before, during, and/or after implementation of a schedule optimization process, and all of the information illustrated in and described with reference to FIGS. 12A and 12B need not be presented. One of ordinary skill in the art would recognize and appreciate many variations, modifications, and alternatives.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. Further, embodiments may include some or all of the systems, methods, apparatus, etc. described in one or more of the following commonly assigned applications, each of which is incorporated by reference herein in its entirety for all purposes: U.S. Ser. No. 13/842,213, supra; U.S. Ser. No. 13/632,118 (Ref. No. NES0119-US) filed Sep. 30, 2012; U.S. Ser. No. 13/632,093 (Ref. No. NES0122-US) filed Sep. 30, 2012; U.S. Ser. No. 13/632,028 (Ref. No. NES0124-US) filed Sep. 30, 2012; U.S. Ser. No. 13/632,041 (Ref. No. NES0162-US) filed Sep. 30, 2012; U.S. Ser. No. 13/632,070 (Ref. No. NES0234-US) filed Sep. 30, 2012; U.S. Prov. Ser. No. 61/704,437, supra (Ref. No. NES0254-US); PCT Application No. PCT/US12/20026 (Ref. No. NES0185-PCT) filed Jan. 3, 2012; PCT Application No. PCT/US12/00007 (Ref. No. NES0190-PCT), filed Jan. 3, 2012; and U.S. Ser. No. 13/269,501 (Ref. No. NES0120-US) filed Oct. 7, 2011.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

While the principles of the disclosure have been described above in connection with specific apparatuses and methods, it is to be clearly understood that this description is made only by way of example and not as limitation on the scope of the present teachings.

What is claimed is:

1. A method of carrying out a demand response (DR) event by an intelligent, network-connected thermostat associated with a structure, the method comprising:

identifying, by the thermostat, a DR event that defines a DR event period;

accessing, by the thermostat, a plurality of parameter sets;

generating, by the thermostat, candidate setpoint schedules during the DR event for the plurality of parameter sets;

simulating, by the thermostat, each of the candidate setpoint schedules using a thermodynamic model of how the structure responds to a heating, ventilation, and air conditioning (HVAC) system;

generating, by the thermostat, predicted indoor temperature profiles or HVAC duty cycle schedules for each of the simulated candidate setpoint schedules;

evaluating, by the thermostat, a cost function for each of the predicted indoor temperature profiles or HVAC duty cycle schedules;

selecting, by the thermostat, an optimal predicted indoor temperature profile or HVAC duty cycle schedule that minimizes the cost function;

selecting, by the thermostat, an optimal setpoint schedule as being the candidate setpoint schedule associated with the optimal predicted indoor temperature profile or HVAC duty cycle schedule; and controlling, by the thermostat, the HVAC system during the DR event period in accordance with the optimal setpoint schedule.

2. The method of claim 1, further comprising:

receiving a request to display a candidate setpoint schedule corresponding to the optimal predicted indoor temperature profile; and causing one or more effective setpoints to be displayed in the place of one or more setpoints in the candidate setpoint schedule.

3. The method of claim 2, wherein the one or more effective setpoints correspond to peaks and troughs in the optimal predicted indoor temperature profile.

4. The method of claim 2, wherein the one or more effective setpoints is displayed as a static schedule instead of a continuously changing schedule that would be displayed for the candidate setpoint schedule.

5. The method of claim 2, wherein the one or more effective setpoints are fewer than the one or more setpoints in the candidate setpoint schedule that are replaced by the one or more effective setpoints.

6. The method of claim 1, wherein the cost function comprises a combination of:

a first factor representative of a total energy consumption of the HVAC system during the DR event period;

a second factor representative of a metric of occupant discomfort in the structure; and a third factor representative of deviations of a rate of energy consumption of the HVAC system from an equalized rate of energy consumption of the HVAC system over the DR event period such that the rate of energy consumption by the HVAC system over the DR event period can be made substantially constant.

7. The method of claim 1, wherein each parameter set comprises:

a first parameter indicative of a temperature-wise offset from a temperature setpoint of an original setpoint schedule; and a second parameter indicative of a slope of a linear sequence of temperature setpoints passing through a point at the temperature-wise offset from the temperature setpoint of the original setpoint schedule, wherein the temperature-wise offset and the slope of the linear sequence of temperature setpoints are designed to assist in reducing the deviations of the rate of energy consumption over the DR event period.

8. The method of claim 7, wherein each parameter set further comprises:

a third parameter indicative of a maximum HVAC duty cycle period; and a fourth parameter indicative of a duration of the pre-DR event period.

9. An intelligent network-connected thermostat for controlling an operation of an HVAC system in a structure, the thermostat comprising:

HVAC control circuitry operable to actuate one or more elements of the HVAC system;

one or more sensors for measuring characteristics of a smart home environment; and a processor coupled to the HVAC control circuitry and the one or more sensors and operable to cause the thermostat to perform operations comprising:

identifying a DR event that defines a DR event period;

accessing a plurality of parameter sets;

generating candidate setpoint schedules during the DR event for the plurality of parameter sets;

simulating each of the candidate setpoint schedules using a thermodynamic model of how the structure responds to the HVAC system;

generating predicted indoor temperature profiles or HVAC duty cycle schedules for each of the simulated candidate setpoint schedules;

evaluating a cost function for each of the predicted indoor temperature profiles or HVAC duty cycle schedules;

selecting an optimal predicted indoor temperature profile or HVAC duty cycle schedule that minimizes the cost function;

selecting, by the thermostat, an optimal setpoint schedule as being the candidate setpoint schedule associated with the optimal predicted indoor temperature profile or HVAC duty cycle schedule; and controlling, by the thermostat, the HVAC system during the DR event period in accordance with the optimal setpoint schedule.

10. The thermostat of claim 9, wherein the operations further comprise:

determining whether the HVAC system should be controlled in accordance with a different predicted indoor temperature profile or HVAC duty cycle schedule; and upon determining that the HVAC system should be controlled in accordance with a different predicted indoor temperature profile or HVAC duty cycle schedule:

identifying a new predicted indoor temperature profile or HVAC duty cycle schedule; and controlling the HVAC system in accordance with the new predicted indoor temperature profile or HVAC duty cycle schedule.

11. The thermostat of claim 10, wherein determining whether the HVAC system should be controlled in accordance with a different predicted indoor temperature profile or HVAC duty cycle schedule is performed periodically during the DR event period.

12. The thermostat of claim 10, wherein determining whether the HVAC system should be controlled in accordance with a different predicted indoor temperature profile or HVAC duty cycle schedule includes one or more of:

monitoring an indoor temperature of the structure and comparing the monitored indoor temperature of the structure to a predicted indoor temperature of the structure;

monitoring a state of the HVAC system and comparing the monitored state of the HVAC system to a predicted state of the HVAC system;

monitoring a real-time occupancy of the structure; and determining whether the optimal predicted indoor temperature profile or HVAC duty cycle schedule fails.

13. The thermostat of claim 10, wherein identifying the new predicted indoor temperature profile or HVAC duty cycle schedule includes one of:

determining a newly optimized predicted indoor temperature profile or HVAC duty cycle schedule that minimizes the cost function;

determining an original control trajectory; and determining a default control trajectory.

14. The thermostat of claim 9, wherein the operations further comprise:
    monitoring an indoor temperature of the structure;
    comparing the monitored indoor temperature of the structure to a predicted indoor temperature of the structure; and
    upon determining that the monitored indoor temperature is different from the predicted indoor temperature of the structure by at least a certain amount:
    determining a default control trajectory; and
    controlling the HVAC system in accordance with the default control trajectory.

15. The thermostat of claim 9, wherein the operations further comprise:
    monitoring a state of the HVAC system;
    comparing the monitored state of the HVAC system to a predicted state of the HVAC system; and
    upon determining that the monitored indoor temperature is different from the predicted indoor temperature of the structure by at least a certain amount:
    determining a newly optimized control trajectory that minimizes the cost function; and
    controlling the HVAC system in accordance with the newly optimized control trajectory.

16. A non-transitory computer-readable medium comprising instructions that, when executed by one or more processors of a thermostat, cause the one or more processors of the thermostat to perform operations comprising:
    identifying, by the thermostat, a DR event that defines a DR event period;
    accessing, by the thermostat, a plurality of parameter sets;
    generating, by the thermostat, candidate setpoint schedules during the DR event for the plurality of parameter sets;
    simulating, by the thermostat, each of the candidate setpoint schedules using a thermodynamic model of how the structure responds to a heating, ventilation, and air conditioning (HVAC) system;
    generating, by the thermostat, predicted indoor temperature profiles or HVAC duty cycle schedules for each of the simulated candidate setpoint schedules;
    evaluating, by the thermostat, a cost function for each of the predicted indoor temperature profiles or HVAC duty cycle schedules;
    selecting an optimal predicted indoor temperature profile or HVAC duty cycle schedule that minimizes the cost function;
    selecting, by the thermostat, an optimal setpoint schedule as being the candidate setpoint schedule associated with the optimal predicted indoor temperature profile or HVAC duty cycle schedule; and
    controlling, by the thermostat, the HVAC system during the DR event period in accordance with the optimal setpoint schedule.

17. The non-transitory computer-readable medium of claim 16, wherein the operations further comprise:
    determining an original control trajectory of the HVAC system;
    comparing the optimized predicted indoor temperature profile or HVAC duty cycle schedule to the original control trajectory; and
    controlling the HVAC system in accordance with the original control trajectory upon determining that the optimized predicted indoor temperature profile or HVAC duty cycle schedule is similar to within a threshold amount of the original control trajectory.

18. The non-transitory computer-readable medium of claim 16, wherein the operations further comprise:
    receiving a user input indicative of a user amenability to DR load shifting; and
    weighting one or more of a first factor, a second factor, and a third factor based on the user input.

19. The non-transitory computer-readable medium of claim 16, wherein the operations further comprise:
    determining an occupancy probability profile indicating a likelihood of a structure associated with the HVAC system being occupied during the DR event period,
    wherein the metric of occupant discomfort is determined at least in part on the occupancy probability profile.

20. The non-transitory computer-readable medium of claim 16, wherein determining an optimized predicted indoor temperature profile or HVAC duty cycle schedule includes identifying an optimal one of the plurality of candidate parameter sets by applying the associated optimal setpoint schedule to a model of the HVAC system, the model being operable to predict an indoor temperature trajectory for a given HVAC control trajectory.

* * * * *